(12) United States Patent
Brav et al.

(10) Patent No.: US 10,449,445 B2
(45) Date of Patent: Oct. 22, 2019

(54) FEEDBACK FOR ENHANCED SITUATIONAL AWARENESS

(71) Applicant: Elwha LLC, Bellevue, WA (US)

(72) Inventors: Ehren J. Brav, Bainbridge Island, WA (US); Alistair K. Chan, Bainbridge Island, WA (US); William David Duncan, Mill Creek, WA (US); Michael Allan Schneider, Bainbridge Island, WA (US)

(73) Assignee: Elwha LLC, Bellevue, WA (US)

( * ) Notice: Subject to any disclaimer, the term of this patent is extended or adjusted under 35 U.S.C. 154(b) by 542 days.

(21) Appl. No.: 15/004,522

(22) Filed: Jan. 22, 2016

(65) Prior Publication Data

US 2016/0184703 A1 Jun. 30, 2016

Related U.S. Application Data

(63) Continuation-in-part of application No. 14/746,454, filed on Jun. 22, 2015.

(60) Provisional application No. 62/234,498, filed on Sep. 29, 2015, provisional application No. 62/090,751, filed on Dec. 11, 2014.

(51) Int. Cl.
*A63F 13/285* (2014.01)
*A63F 13/5378* (2014.01)
*A63F 13/213* (2014.01)
*A63F 13/5372* (2014.01)
*G06F 3/01* (2006.01)

(52) U.S. Cl.
CPC .......... *A63F 13/285* (2014.09); *A63F 13/213* (2014.09); *A63F 13/5372* (2014.09); *A63F 13/5378* (2014.09); *G06F 3/011* (2013.01);

*G06F 3/012* (2013.01); *G06F 3/016* (2013.01); *A63F 2300/308* (2013.01); *A63F 2300/8082* (2013.01)

(58) Field of Classification Search
None
See application file for complete search history.

(56) References Cited

U.S. PATENT DOCUMENTS 5,565,840 A 10/1996 Thorner et al.
6,411,276 B1 6/2002 Braun et al.
(Continued)

OTHER PUBLICATIONS

"Jabra goes behind-the-neck with the Halo Smart Bluetooth headphones"; TechCrunch; bearing a date of Jun. 7, 2016; printed on Aug. 24, 2016; pp. 1-7; located at: https://techcrunch.com/2016/06/07/jabra-halo-smart/.

(Continued)

*Primary Examiner* — Robert T Clarke, Jr.
(74) *Attorney, Agent, or Firm* — Foley & Lardner LLP

(57) ABSTRACT

An electronic game feedback system includes a display device, a sensor system, and a feedback device. The display device is configured to provide a display of a virtual environment associated with an electronic game to a user. The display device at least partially obstructs the view of the user of a physical environment surrounding the user. The sensor system is configured to acquire object data regarding an object located within the physical environment. The feedback device is configured to provide feedback to the user based on the object data and indicative of a location of the object relative to the user.

29 Claims, 11 Drawing Sheets

(56) References Cited

U.S. PATENT DOCUMENTS

| | | |
|---|---|---|
| 6,430,450 B1 | 8/2002 | Bach-Y-Rita et al. |
| 6,714,213 B1 | 3/2004 | Lithicum et al. |
| 6,831,640 B2 | 12/2004 | Shih et al. |
| 6,965,312 B2 | 11/2005 | Lerg |
| 7,132,928 B2 | 11/2006 | Perricone |
| 7,570,426 B2 | 8/2009 | Rodgers et al. |
| 7,696,860 B2 | 4/2010 | Gilson et al. |
| 7,696,919 B2 | 4/2010 | Moraites |
| 8,308,558 B2 | 11/2012 | Thorner |
| 8,362,945 B2 | 1/2013 | Nguyen et al. |
| 9,107,012 B2 | 8/2015 | Lord et al. |
| 9,146,251 B2 | 9/2015 | Moraites et al. |
| 9,464,949 B2 | 10/2016 | Mahlen et al. |
| 9,754,167 B1 | 9/2017 | Holz et al. |
| 2005/0073439 A1 | 4/2005 | Perricone |
| 2005/0225443 A1 | 10/2005 | Lerg |
| 2006/0166678 A1 | 7/2006 | Karaoguz et al. |
| 2006/0241718 A1 | 10/2006 | Tyler et al. |
| 2007/0139167 A1 | 6/2007 | Gilson et al. |
| 2008/0120029 A1 | 5/2008 | Zelek et al. |
| 2009/0213114 A1 | 8/2009 | Dobbins et al. |
| 2009/0319058 A1 | 12/2009 | Rovaglio et al. |
| 2010/0040238 A1 | 2/2010 | Jang et al. |
| 2011/0025492 A1 | 2/2011 | Bravo |
| 2011/0245942 A1* | 10/2011 | Yamamoto ............ A63F 13/803 700/91 |
| 2012/0122558 A1* | 5/2012 | Lyons ................. G07F 17/3241 463/25 |
| 2012/0124470 A1 | 5/2012 | West et al. |
| 2012/0146291 A1 | 6/2012 | Walker |
| 2012/0200667 A1 | 8/2012 | Gay et al. |
| 2012/0256779 A1 | 10/2012 | Nguyen et al. |
| 2013/0021195 A1 | 1/2013 | Gould et al. |
| 2013/0218456 A1 | 8/2013 | Zelek et al. |
| 2014/0218184 A1 | 8/2014 | Grant et al. |
| 2014/0235354 A1 | 8/2014 | Takeuchi |
| 2014/0267904 A1* | 9/2014 | Saboune ................. G08B 6/00 348/460 |
| 2014/0287806 A1 | 9/2014 | Balachandreswaran |
| 2015/0201181 A1 | 7/2015 | Moore et al. |
| 2015/0258444 A1 | 9/2015 | Norden |
| 2015/0268475 A1 | 9/2015 | Lee et al. |
| 2015/0355711 A1 | 12/2015 | Rihn |

OTHER PUBLICATIONS

PCT International Search Report; International App. No. PCT/US2015/064778; dated Mar. 21, 2016; pp. 1-3.

Berkley, Haptic Devices, May 5, 2003, pp. 1-4, Mimic Technologies Inc.

Bernstein et al., Sniper Bullet Detection by Millimeter-Wave Radar, Proc. SPIE 3577, Sensors, C3I, Information and Technologies for Law Enforcement, 231, Jan. 7, 1999, pp. 1-3, located at http://proceedings.spiedigitallibrary.org/proceeding.aspx?articleid=974277.

Best Practices for Use of Vibration Feedback in Video Console Games, Immerson Corporation, 2010, 24 pages.

Brown et al., Ku-Band Retrodirective Radar for Ballistic Projectile Detection and Tracking, Radar Conference 2009, May 4-8, 2009, pp. 1-4, IEEE.

Brown, Retrodirective Noise Correlating Radar: Fast Detection of Small Projectiles Plus Imaging of the Scene, SBIT-STTR: America's Seed Fund, Bearing a date of 2006, created on Nov. 4, 2015, located at https://www.sbir.gov/sbirsearch/detail/271231.

Buswell et al., The Bat Hat, Ultrasonic range-finder with haptic feedback, ECE 4760: Final Project, 2013, 27 pages.

Cassinelli et al., Augmenting spatial awareness with Haptic Radar, 2006 IEEE, 4 pages.

Haptic Feedback device for the Visually Impaired [Project HALO], from Instructables.com (http://www.instructables.com/id/Haptic-Feedback-device-for-the-Visually-Impaired/), retrieved on Dec. 3, 2014, 31 pages.

Harmer et al., Radar Identification of Hostile Fire by Means of the Electromagnetic Complex Natural Resonances of Projectiles, Progress in Electromagnetics Research M, Apr. 21, 2012, pp. 167-178, vol. 24.

Hommes et al., A Fast Tracking 60 GHz Radar Using a Frequency Scanning Antenna, Infrared, Millimeter, and Terahertz Waves (IRMMW-THz), 2014 39th International Conference, Sep. 14-19, 2014, pp. 1-2; IEEE.

Kit Eaton, Intendix: Computer Thought-Control Fantasy Made Real, Fast Company, 2014, 8 pages.

Li et al., Real-Time Tracking of Bullet Trajectory Based on Chirp Transform in a Multi-Sensor Multi-Frequency Radar, Radar Conference, 2010 IEEE, May 10-14, 2010, pp. 1203-1207, IEEE.

Marvel Heroes, from Marvelheroes.com (https://forums.marvelheroes.com/discussion/2403/spidey-senses-that-should-be-in-game-what-do-you-think), retrieved on Nov. 7, 2014, 12 pages.

Mateevitsi et al., Sensing the environment through SpiderSense, Augmented Humanity, Mar. 7-8, 2003, Stuttgart, Germany, pp. 51-57.

Pinezich et al., A Ballistic Projectile Tracking System Using Continuous Wave Doppler Radar, created on Nov. 4, 2015, 7 pages.

SPiDR Hostile Fire Radar Delivers Stealthy, Speed-of-Light Detection of Incoming Fire, Syntonics, bearing a date of 2015, created on Nov. 4, 2015, p. 1, located at http://www.syntonicscorp.com/rd-spidr.html.

Tingling Electronic Spidey Sense Shirt, from Thinkgeek.com (http://www.thinkgeek.comproduct/f0b1/),retrieved on Nov. 7, 2014, 5 pages.

Wolf et al., Towards Supporting Situational Awareness using Tactile Feedback, IEEE Symposium on 3D User Interfaces, Mar. 29-30, 2014, Minneapolis, Minnesota, pp. 131-132.

PCT International Search Report; International App No. PCT/US2016/025587; dated Sep. 12, 2016; pp. 1-3.

* cited by examiner

FEEDBACK FOR ENHANCED SITUATIONAL AWARENESS

CROSS-REFERENCE TO RELATED PATENT APPLICATIONS

This application is a continuation-in-part of U.S. patent application Ser. No. 14/746,454, filed Jun. 22, 2015, which claims the benefit of U.S. Provisional Application No. 62/090,751, filed Dec. 11, 2014. This application also claims the benefit of U.S. Provisional Application No. 62/234,498, filed Sep. 29, 2015. All of these applications are incorporated herein by reference in their entireties.

BACKGROUND

The present disclosure relates generally to providing feedback (e.g., haptic feedback, audible feedback, visual feedback, etc.) to users. Feedback provides users with stimulation in the form of forces, vibrations, sounds, lights, or the like.

SUMMARY

One embodiment relates to an electronic game feedback system. The electronic game feedback system includes a display device, a sensor system, and a feedback device. The display device is configured to provide a display of a virtual environment associated with an electronic game to a user. The display device at least partially obstructs the view of the user of a physical environment surrounding the user. The sensor system is configured to acquire object data regarding an object located within the physical environment. The feedback device is configured to provide feedback to the user based on the object data and indicative of a location of the object relative to the user.

Another embodiment relates to an electronic game feedback system. The electronic game feedback system includes a display device, a sensor system, and a feedback device. The display device is configured to provide a display of a virtual environment associated with an electronic game to a user. The display device at least partially obstructs the view of the user of a physical environment surrounding the user. The sensor system is configured to acquire object data regarding an object located within the physical environment. The feedback device is configured to generate a virtual representation of the physical object for display by the display device within the virtual environment. The virtual representation provides an indication of a location of the physical object relative to the user within the physical environment.

Another embodiment relates to an electronic game feedback system. The electronic game feedback system includes a sensor system and a feedback device. The sensor system is configured to acquire display data from a display provided by a display device. The display being a display of a virtual environment associated with an electronic game. The electronic game is associated with a primary object and a secondary object. The display data is indicative of characteristics of at least one of the virtual environment, the primary object, and the secondary object. The feedback device is configured to provide feedback to a user based on the display data.

Another embodiment relates to an electronic game feedback system. The electronic game feedback system includes a processing circuit communicably and operatively coupled to a sensor system and a feedback device. The processing circuit is configured to receive display data from the sensor system regarding a display of a virtual environment associated with an electronic game provided by a display device, and provide a command to the feedback device to provide feedback to a user based on the display data. The electronic game is associated with a primary object and a secondary object. The display data is indicative of characteristics of at least one of the virtual environment, the primary object, and the secondary object.

Another embodiment relates to a feedback system for providing feedback regarding a user environment. The feedback system includes a sensor and a feedback device. The sensor is configured to acquire environment data regarding an environment surrounding a user and user data regarding at least one of movements, a location, and an orientation of the user within the environment. The feedback device is configured to provide feedback to the user based on the environment data and the user data indicating the user is near one or more potential hazards or dangers. The feedback device may be a wearable feedback device.

Another embodiment relates to a method for providing feedback to a user of an electronic game. The method includes providing, by a display device, a display of a virtual environment associated with an electronic game to a user, the display device at least partially obstructing the view of the user of a physical environment surrounding the user; acquiring, by a sensor system, object data regarding an object located within the physical environment; and providing, by a feedback device, feedback to the user based on the object data and indicative of a location of the object relative to the user.

Another embodiment relates to a method for providing feedback to a user of an electronic game. The method includes providing, by a display device, a display of a virtual environment associated with the electronic game to a user, the display device at least partially obstructing the view of the user of a physical environment surrounding the user; acquiring, by a sensor system, object data regarding a physical object located within the physical environment; and displaying, by the display device, a virtual representation of the physical object within the virtual environment. The virtual representation provides an indication of a location of the physical object relative to the user within the physical environment.

Another embodiment relates to a method for providing feedback to a user of an electronic game. The method includes receiving, by a processing circuit from a sensor system, display data acquired from a display of a virtual environment associated with the electronic game provided by a display device; and providing, by the processing circuit to a feedback device, a command to provide feedback to the user based on the display data. The electronic game is associated with a primary object and a secondary object. The display data is indicative of characteristics of at least one of the virtual environment, the primary object, and the secondary object.

Another embodiment relates to a method for providing feedback to a user regarding a user environment. The method includes acquiring, by a sensor, environment data regarding an environment surrounding the user and user data regarding at least one of movements, a location, and an orientation of the user within the environment; and providing, by a feedback device, feedback to the user based on the environment data and the user data indicating the user is near one or more potential hazards or dangers. The feedback device may be a wearable feedback device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
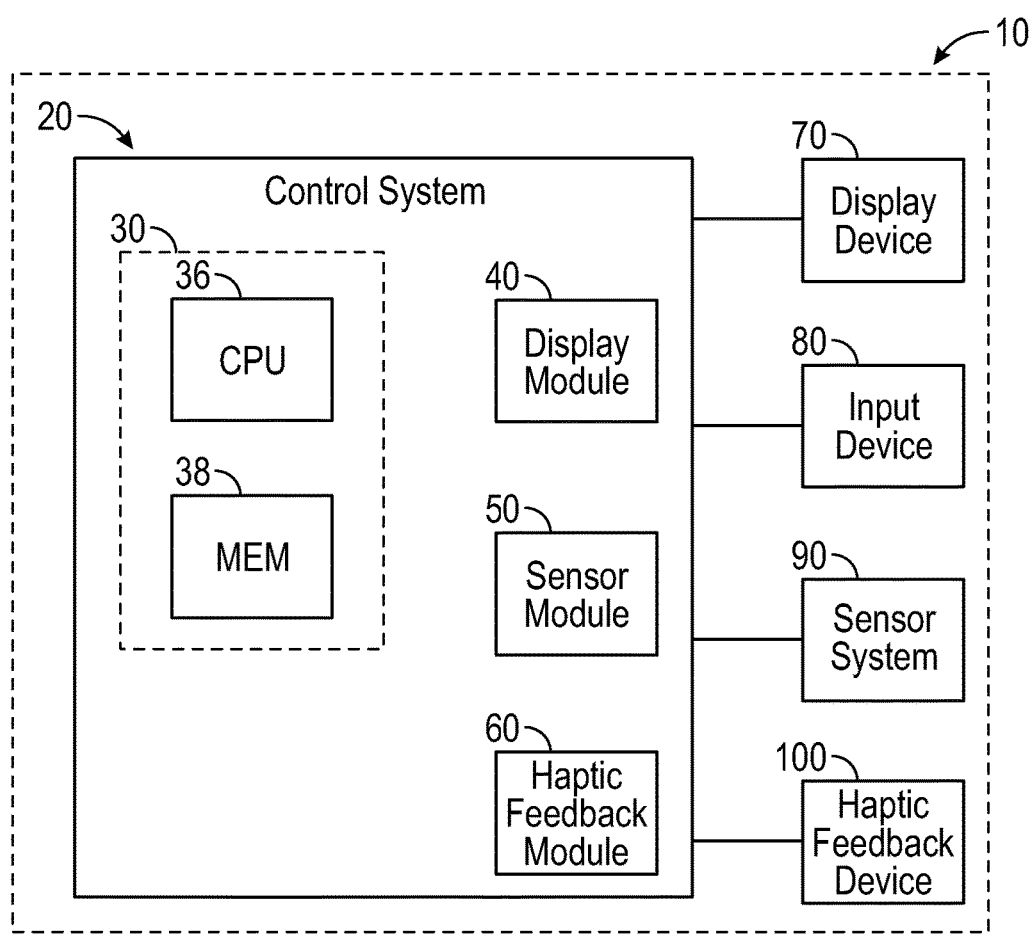
FIG. 1 is a schematic block diagram of a feedback system, according to one embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the figures generally, various embodiments disclosed herein relate to a feedback system (e.g., a haptic feedback system, an audible/visual feedback system, combinations thereof, etc.) intended to enhance the situational awareness of a user in a given situation (e.g., in an electronic game, in a real-world application, a combination of being in a physical environment while immersed in a virtual environment, etc.). When a threat or other object (e.g., an opponent, an enemy, a danger zone, etc.) is looking at (e.g., gazing, etc.), within the proximity of, and/or obstructing movement of a user (or virtual character) of the feedback system, feedback (e.g., haptic feedback, audible feedback, visual feedback, etc.) may be provided to the user to make him/her aware of objects not in his/her field of view, other people or virtual characters gazing in his/her direction, and/or to identify an object in the user's proximity as a threat or hazard. Ideally, the feedback becomes second nature to the user of the feedback system such that he/she develops an intuitive sense of the surroundings and/or a virtual environment. The feedback may be haptic, audible, visual, or combinations thereof, among other possibilities.

For example, electronic game players are not always aware of objects, other players, and/or threats within an electronic game, due to limitations of field of vision, distractions, skill, etc. The systems disclosed herein in accordance with various embodiments provide players with feedback regarding a primary object (e.g., a character used by the electronic game player, a vehicle driven by the electronic game player, etc.) and a secondary object (e.g., other virtual characters, vehicles, dangers, remote from the primary object, a distal object, etc.). The feedback may be generated based on various data regarding the primary object, secondary objects, a surrounding virtual environment, etc., and may be provided so as to provide an indication of a directness of a gaze, a virtual distance, a virtual direction, an affiliation, a threat level (or nature or type of the secondary object), a relative velocity, an absolute velocity, a relative acceleration, an absolute acceleration, and the like between the primary object and the secondary object. The feedback may also provide a user of the virtual character with an indication of a condition (e.g., health, armor level, etc.) of the virtual character and/or the user themselves (e.g., heart rate, breathing patterns, etc.). The feedback system may also be configured to provide a user immersed within a virtual environment an indication of a physical environment surrounding the user that is at least partially obstructed by a display device (e.g., virtual reality glasses, etc.) of the feedback system.

Similarly, users may likewise use the systems disclosed herein for real-world applications such as driving, treatment for sight or hearing-impaired persons, aviation, sports, combat, construction, etc. For example, a paintball player may not always recognize/see other players of an opposing team or may have an opposing player sneak up from a side or rearward position. The systems disclosed herein in accordance with various embodiments are configured to provide a user of the feedback system with feedback (e.g., haptic feedback, audible feedback, visual feedback, etc.), thereby increasing the user's awareness of potential threats or other information that may be conveyed through audible, tactile, and/or visual stimulation. In another example, a construction worker may be working in a potentially hazardous area (e.g., on a construction site with a ledge, etc.) or a factory worker may be warned about staying away from dangers within a factory (e.g., near rotating/moving equipment or hot surfaces, etc.). The feedback system may provide feedback to the user such that they have a "6th sense," leading to an intuitive understanding of his/her surrounding to facilitate avoiding dangerous areas and/or materials.

Electronic Game Feedback System

According to the example embodiment shown in FIGS. 1-7B, feedback system 10 (e.g., situational awareness system, etc.) is configured as an electronic game feedback system. In one embodiment, feedback system 10 is configured to provide feedback to a user playing an electronic game (e.g., a first person shooter game, a racing game, a fighting game, a console game, a computer game, a mobile game, etc.). In other embodiments, feedback system 10 is configured to provide feedback during real-world applications (e.g., physical activity, construction, etc.). As shown in FIG. 1, feedback system 10 includes control system 20, display device 70, input device 80, sensor system 90, and feedback device 100.

In general terms, control system 20 is configured to provide a display (e.g., a virtual environment, a primary object, distal secondary objects, etc.) to a user playing an electronic game. Control system 20 receives various types of data regarding users of feedback system 10, a primary object (e.g., a virtual character, a virtual vehicle, etc.), a surrounding physical environment, a virtual environment, distal secondary objects (e.g., threats, other players, other virtual characters, remote objects, inanimate objects, etc.), etc. Using the data, control system 20 controls the operation of feedback device 100 to provide feedback to a user based on the data. In one embodiment, control system 20 is configured to be used with or installed within a game console. In some embodiments, control system 20 is configured to be used with or installed within virtual reality glasses. In other embodiments, control system 20 is configured to be used with or installed within a desktop computer, a laptop, a smartphone, a tablet, or other suitable platform used to operate and/or be used with an electronic game. In some embodiments, control system 20 is configured to be used with a combination of a game console and a portable device (e.g., smartphone, tablet, laptop, camera device, etc.).

As shown in FIG. 1, control system 20 includes processing circuit 30, display module 40, sensor module 50, and feedback module 60. In one embodiment, processing circuit 30 is in data communication with at least one of display module 40, sensor module 50, and feedback module 60 such that data may be transferred between the modules of control system 20 and processing circuit 30.

As shown in FIG. 1, processing circuit 30 includes processor 36 and a memory 38. Processor 36 may be implemented as a general-purpose processor, an application specific integrated circuit (ASIC), one or more field programmable gate arrays (FPGAs), a digital-signal-processor (DSP), a group of processing components, or other suitable electronic processing components. Memory 38 is one or more devices (e.g., RAM, ROM, Flash Memory, hard disk storage, etc.) for storing data and/or computer code for facilitating the various processes described herein. Memory 38 may be or include non-transient volatile memory or non-volatile memory. Memory 38 may include database components, object code components, script components, or any other type of information structure for supporting the various activities and information structures described herein. Memory 38 may be communicably connected to processor 36 and provide computer code or instructions to processor 36 for executing the processes described herein.

According to an example embodiment, display module 40 is configured to provide a display to display device 70 associated with an electronic game. Display device 70 is configured to provide the display of the electronic game to a user of feedback system 10. In one embodiment, the display includes a primary object (e.g., a virtual vehicle such as a car, plane, spaceship, boat; a virtual character such as an athlete, a soldier, a ninja; etc.) chosen by the user and a virtual environment (e.g., race track, athletic field, war zone, outer space, etc.) around the primary object. In some embodiments, the display further includes a secondary object (e.g., a virtual character controlled by another user, a virtual character controlled by control system 20, etc.). In some embodiments, the secondary object is an inanimate object within an electronic game (e.g., a ball, a missile, a bullet, a meteor, a boulder, a vehicle, etc.). In other embodiments, the secondary object is an inanimate object that provides an indication of a physical object within the physical environment surrounding the user of feedback system 10.

Figure 3A:
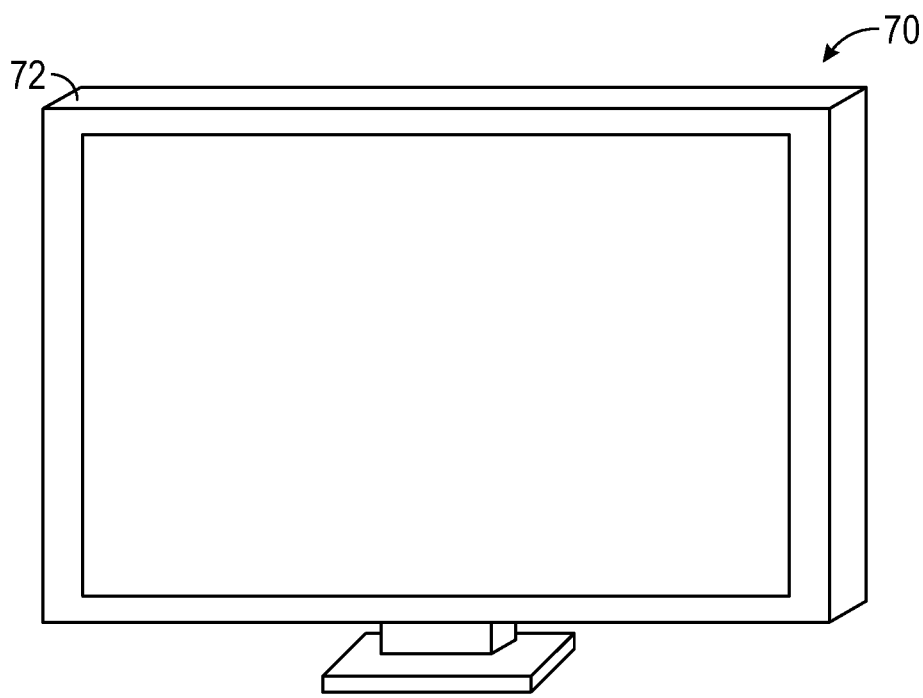
FIG. 3A is an illustration of a stationary display device used with a feedback system, according to one embodiment.
Figure 3B:
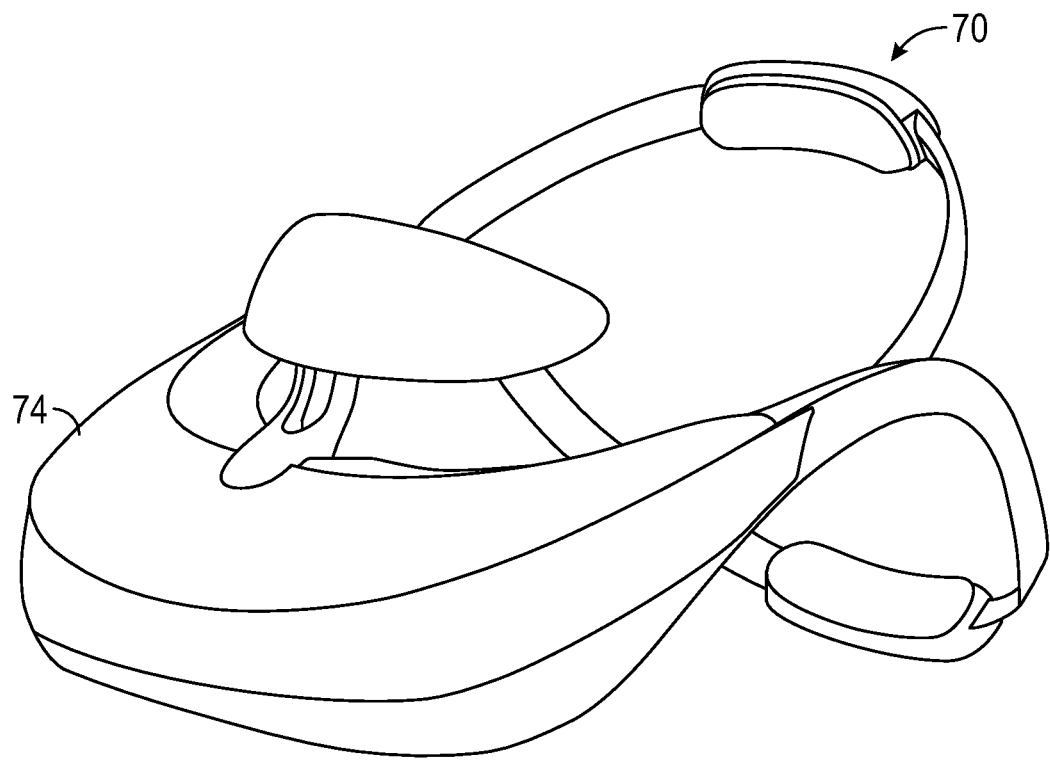
FIG. 3B is an illustration of a wearable display device used with a feedback system, according to one embodiment.

As shown in FIG. 3A, in one embodiment, display device 70 includes a stationary display device, shown as television 72. By way of example, television 72 may be any type of television, screen, touchscreen, or monitor (e.g., LCD, LED, etc.) configured to provide the display of the electronic game to a user. In another embodiment, display device 70 includes a projectable display device such as a video projector with a screen, a portable device with projection capabilities, and the like. As shown in FIG. 3B, in other embodiments, display device 70 includes a wearable display device, shown as virtual reality (VR) glasses 74, configured to be worn over the eyes of a user and provide the display of the electronic game to the user. In an alternative embodiment, the wearable display device is configured to display an augmented reality (AR) display to a user. Thus, the wearable display device may at least partially obstruct the user's view of the surrounding physical environment. VR glasses 74 may include various sensors configured to track movement of the user (e.g., orientation, acceleration, speed, etc.) to correspond with movement and/or actions taken by a virtual character within a virtual environment of the electronic game, as well as adjust the display (e.g., based on head orientation, etc.). The various sensors of VR glasses 74 may include a still camera, a video camera, a gyroscope, an accelerometer, a compass, a proximity sensor, a radar, a lidar, and/or still other sensors.

Figure 3C:
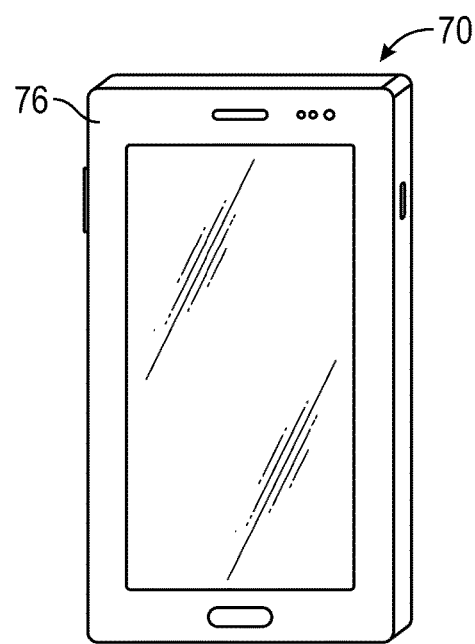
FIG. 3C is an illustration of a portable display device used with a feedback system, according to one embodiment.

As shown in FIG. 3C, in other embodiments, display device 70 includes a portable electronic device, shown as portable device 76, configured to provide the display of the electronic game to a user. Portable device 76 may include, but is not limited to, a smartphone, a tablet, a laptop, a portable game console, a camera device, or still another portable electronic device (e.g., configured to provide the display of the electronic game to a user, etc.).

Figure 3D:
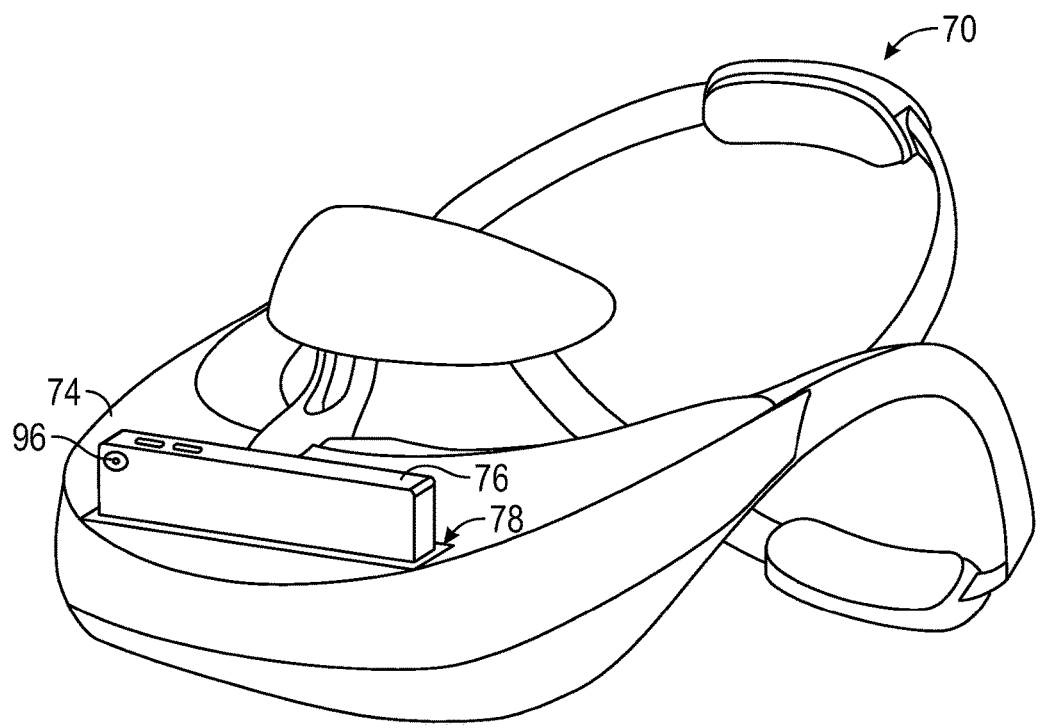
FIG. 3D is an illustration of a wearable display device with a portable device used with a feedback system, according to one embodiment.

As shown in FIG. 3D, in other embodiments, display device 70 includes VR glasses 74 having a slot or other retaining mechanism (e.g., clip, intermediate coupling device, etc.), shown as portable device retainer 78. Portable device retainer 78 may be configured to receive and hold portable device 76 to and/or within VR glasses 74. As shown in FIG. 3D, portable device 76 may include one or more sensors, shown as portable device sensors 96. Portable device sensors 96 may include a still camera, a video camera, a gyroscope, an accelerometer, a compass, a proximity sensor, a radar, a lidar, and/or still other sensors. In one embodiment, portable device 76 provides the display of the electronic game to a wearer of VR glasses 74. In other embodiments, VR glasses 74 provides the display of the electronic game to a wearer of VR glasses 74, while portable device 76 acquires various information and/or data (e.g., regarding a surrounding environment such as obstacles like furniture, stairs, etc.; regarding movement of the user such as orientation, acceleration, speed, etc.; etc.) with the portable device sensors 96 (e.g., VR glasses 74 may not need some or all of the sensors, reducing the cost thereof, etc.). In still other embodiments, portable device 76 acquires information and/or data regarding the environment and movement of the user with portable device sensors 96 and provides the display of the virtual environment to the user based on the acquired data. Thus, portable device 76 may enable a user of an electronic game to acquire various data for feedback purposes (e.g., haptic, audible, visual, etc.) without requiring the purchase of additional hardware components (e.g., the user may utilize commonly owned camera enabled portable electronic devices such as a personal smartphone, etc.) or expensive VR glasses (e.g., just need glasses that hold portable device 76, etc.).

Referring back to FIG. 1, sensor module 50 is configured to receive data regarding the primary object and the secondary object of the electronic game, according to an example embodiment. The data regarding the primary object (e.g., first data, positional data, condition data, etc.) may include an indication of a head orientation/direction of travel of the primary object (e.g., a direction in which a virtual character is looking and therefore what the user sees on display device 70, a direction in which a vehicle is traveling, etc.), a location of the primary object in the virtual environment, movement of the primary object (e.g., velocity, acceleration, etc.), an attribute and/or condition of the primary object (e.g., a weapon, a shield, an offensive capability, a defensive capability, a health, an experience level, a skill level, a strength, a speed, a sensory capability, an agility, etc.), and/or other data regarding the primary object. The data regarding the secondary object (e.g., second data, threat data, gaze data, etc.) may include an indication of at least one of an affiliation of the secondary object (e.g., opponent, enemy, team member, etc.), a virtual distance to the secondary object (e.g., relative to the location of the primary object, etc.), a threat level/nature of the secondary object (e.g., high threat, low threat, no threat, etc.), an attribute of the secondary object (e.g., a weapon, a shield, an offensive capability, a defensive capability, a health, an experience level, a skill level, a strength, a speed, a sensory capability, an agility, etc.), a location of the secondary object in the virtual environment, a direction between the primary object and the secondary object, a directness of a gaze of the secondary object onto the primary object, an orientation of the secondary object, movement of the secondary object, a velocity of the secondary object (e.g., relative velocity, absolute velocity, etc.), an acceleration of the secondary object (e.g., relative acceleration, absolute acceleration, etc.), and/or still other indications.

In one embodiment, sensor module 50 is further configured to receive event data regarding the electronic game. The event data may include data regarding a setting and/or a condition within the electronic game, such as a change in the level within the game, a change in a situation within the game, performance of the user in the game, an attribute of the primary object, an attribute of the secondary object, a current virtual environment of the game, performance of other users in the game, a difficulty setting of the game, and/or other data.

In some embodiments, sensor system 90 is configured to acquire and provide user data regarding the user of the primary object to sensor module 50. Sensor system 90 may communicate with sensor module 50 in a variety of ways, using any suitable wired and/or wireless communications protocols. According to an example embodiment, sensor system 90 includes a sensor, such as a camera, motion sensor, and/or another device, configured to acquire the user data. In one embodiment, sensor system 90 includes an external sensor system (e.g., located remote from the user, etc.). In other embodiments, sensor system 90 includes a wearable sensor system. The user data may include data regarding an orientation and a movement of at least one of a head, a torso, an arm, and a leg of the user. In one embodiment, the first data of the primary object is based on the user data. For example, the orientation and the movement of the user may be used to control the orientation and movement of a virtual character in a virtual environment.

In some embodiments, sensor system 90 is further configured to acquire and provide object data regarding a physical object (e.g., a wall, a piece of furniture, etc.) located within the physical environment surrounding the user of feedback system 10 to sensor module 50. The object data may include data regarding a position, a size, a proximity/distance, and/or a velocity of the physical object relative to the user of feedback system 10. Sensor system 90 may include a sensor, such as a camera, radar, an infrared sensor, a capacitive sensor, and/or an ultrasonic sensor, to acquire the object data regarding physical objects around the user. In one embodiment, sensor system 90 is configured to dynamically acquire the object data in real time. In some embodiments, sensor system 90 is configured to scan the physical environment (e.g., room, etc.) to pre-register the location and characteristics (e.g., size, etc.) of the physical objects. In this instance, sensor module 50 may be configured to implement dead reckoning techniques using accelerometers of sensor system 90. Thus, sensor module 50 may use the pre-registration of the physical environment, along with registering the starting point of the user within the physical environment, to determine the location and/or velocity of the user relative to the physical objects in the surrounding environment. In some embodiments, the user may be able to indicate certain areas of the surrounding environment in which he/she would like to avoid while using feedback system 10 (e.g., areas with fragile objects such as paintings or china; areas with potential hazardous or dangerous items such as stairs or sharp objects; etc.).

In some embodiments, sensor system 90 is further configured to acquire and provide condition data regarding a condition of the user of feedback system 10 to sensor module 50. The condition data may include data regarding the condition of the user such as heart rate, breathing patterns, temperature, sleeplessness/alertness, time of game play, SpO2 levels, glucose levels, hydration levels, and/or other conditions that may be affected by extended or intense game play. Sensor system 90 may include one or more sensors, such as a heart rate sensor, a temperature sensor, a timer, a respiratory or breathing sensor, and/or still other sensors, to acquire the condition data regarding conditions of the user.

In some embodiments, sensor system 90 is further configured to acquire and provide display data regarding a virtual environment currently being displayed by display device 70 to sensor module 50. The display data may include data regarding the current location of the primary object (e.g., within a map, a virtual world, etc.), the current location of surrounding virtual objects (e.g., secondary object, opponents, houses, buildings, vehicles, geographical landscapes, etc.), a direction of travel (e.g., of the primary object, of the secondary object(s), etc.), a rate of travel (e.g., velocity, acceleration, etc. of primary and/or secondary objects, etc.), range/distance information, bearing information, affiliation information, threat level information, attribute information, etc. The display data may be directly acquired by sensor module 50 and/or acquire by sensor system 90. Sensor system 90 may include a camera device and/or a camera enabled device (e.g., a portable electronic device, etc.) to acquire the display data.

Referring still to FIG. 1, input device 80 is configured to receive an input from the user during the electronic game. The first data (e.g., movement, actions, etc.) of the primary object is based on the input from input device 80, according to an example embodiment. By way of example, input device 80 may be configured to receive at least one of touch inputs, audible inputs, and motion inputs provided though the movement of input device 80 such that a virtual character performs some action (e.g., moves, turns, shoots, etc.).

Figure 4A:
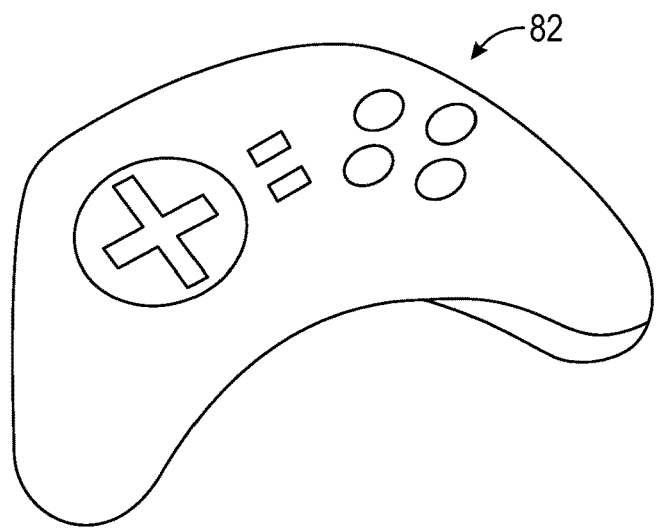
FIG. 4A is an illustration of a hand-held input device used with a feedback system, according to one embodiment.
Figure 4B:
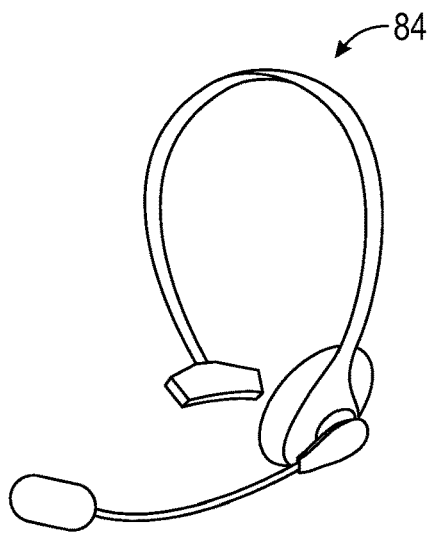
FIG. 4B is an illustration of a voice recognition device used with a feedback system, according to one embodiment.
Figure 4C:
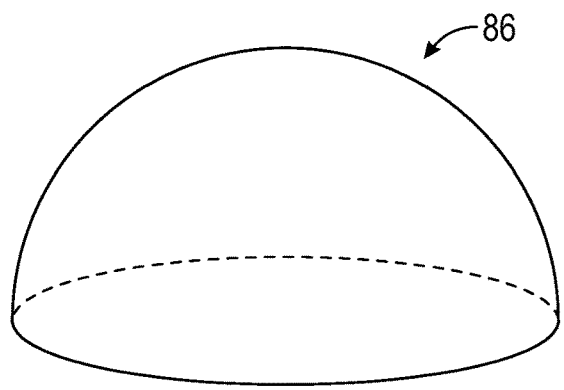
FIG. 4C is an illustration of a touch sensitive input device used with a feedback system, according to one embodiment.

As shown in FIGS. 4A-4C, input device 80 may include a variety of input devices. As shown in FIG. 4A, input device 80 may include or be a hand-held input device, shown as controller 82. In one embodiment, controller 82 is configured to receive touch inputs in the form of button commands. Additionally or alternatively, controller 82 is configured to receive motion inputs through the user repositioning the controller 82 (e.g., a throwing motion, a punching motion, etc.). As shown in FIG. 4B, input device 80 may include or be a voice recognition device (e.g., a headset/microphone device, etc.), shown as headset 84. Headset 84 may be configured to receive voice commands (e.g., audible inputs, etc.) from the user. As shown in FIG. 4C, input device 80 may include or be a touch sensitive input device, shown as touch sensitive device 86. As shown in FIG. 4C, touch sensitive device 86 is hemispheric in shape. In other embodiments, touch sensitive device 86 is another shape (e.g., a touchscreen, etc.). A user of feedback system 10 may provide touch inputs to the exterior of the touch sensitive device 86 for providing input to control the primary object. In some embodiments, touch sensitive device 86 is configured to provide feedback to a user of feedback system 10. For example, portions of the exterior of touch sensitive device may vibrate or illuminate to provide a user with an enhanced awareness of the virtual environment. In another embodiment, input device 80 includes a wearable input device configured to receive motion inputs from the movement of the user and/or touch inputs. In yet another embodiment, the input is provided by movements of the user of feedback system 10 (e.g., monitored by sensor system 90, etc.). In some embodiments, input device 80 and feedback device 100 are included in a single device.

Figure 2A:
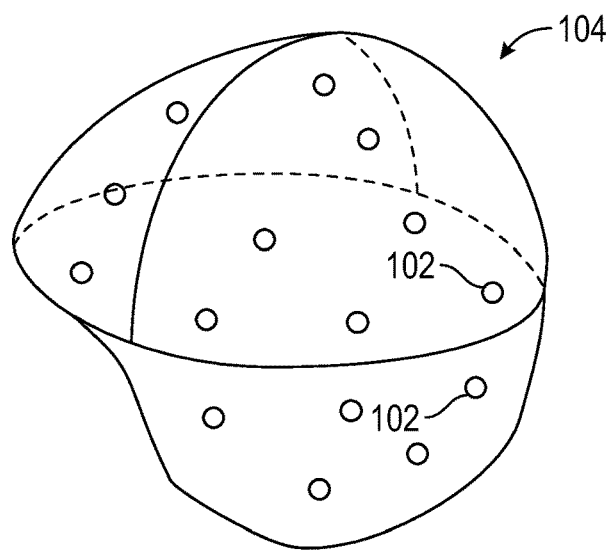
FIG. 2A is an illustration of a wearable headwear feedback device worn by a user of a feedback system, according to one embodiment.
Figure 2B:
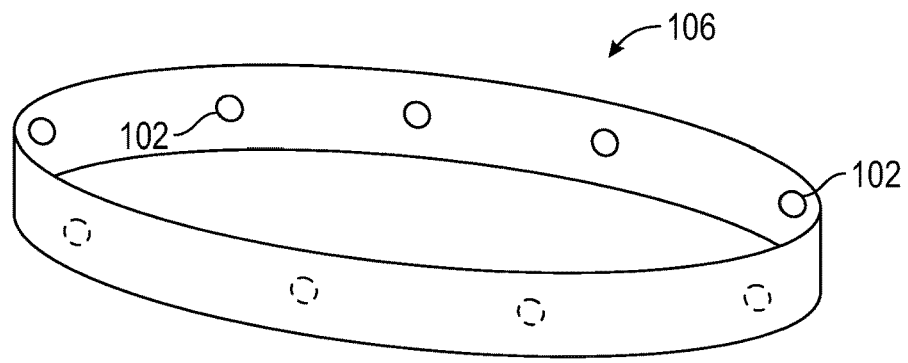
FIG. 2B is an illustration of a wearable band feedback device worn by a user of a feedback system, according to one embodiment.
Figure 2C:
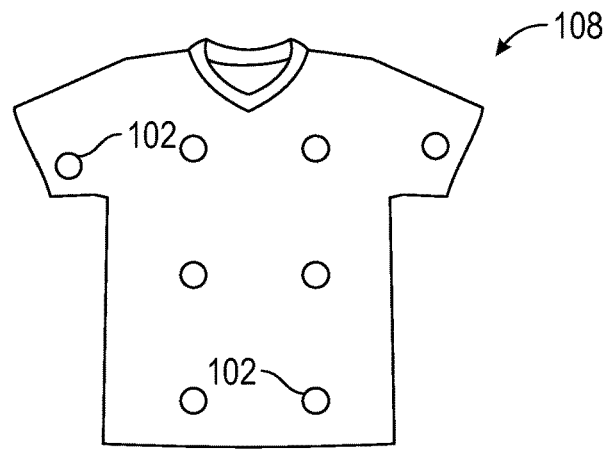
FIG. 2C is an illustration of a wearable clothing feedback device worn by a user of a feedback system, according to one embodiment.

Processing circuit 30 is configured to control operation of feedback device 100 via feedback module 60 based on the data (e.g., first data, second data, event data, user data, gaze data, object data, condition data, display data, etc.) received by sensor module 50. As shown in FIGS. 2A-2C, feedback device 100 may include a variety of wearable feedback devices. The wearable feedback devices include a plurality of feedback elements, shown as elements 102. In one embodiment, elements 102 are configured to provide haptic feedback, visual feedback, and/or audible feedback to the user such that a user has an enhanced situational awareness. In some embodiments, the display device 70 (e.g., VR glasses 74, television 72, etc.) may additionally or alternatively provide haptic, audible, and/or visual feedback to the user. Referring to FIG. 2A, in one embodiment, feedback device 100 includes a wearable headgear device (e.g., helmet, hat, visor, etc.), shown as headgear 104, configured to rest on the head of the user of feedback system 10. As shown in FIG. 2A, headgear 104 includes a plurality of elements 102 disposed about headgear 104. In one embodiment, the plurality of elements 102 are equally spaced about headgear 104. In other embodiments, the plurality of elements 102 are selectively positioned around headgear 104 so as to correspond in location to desired anatomical features (e.g., ears, temple, forehead, nape, crown, etc.) of the user. The size of headgear 104 may be varied to fit various users and to accommodate various types of elements 102 (e.g., haptic, visual, audible, etc.).

Referring now to FIG. 2B, feedback device 100 includes a band, shown as band 106, in some embodiments. Band 106 may include one or more elements 102. In one embodiment, band 106 includes a single element 102. In other embodiments, band 106 includes a plurality of elements 102. In one embodiment, elements 102 are equally spaced about band 106. In other embodiments, elements 102 are selectively positioned along band 106 so as to correspond in location to desired parts of a user's body (e.g., an ear or temple area of the head, a wrist, etc.). The size of band 106 may be varied to fit various users or body parts (e.g., a head, a wrist, an ankle, a waist, etc.) and/or to accommodate various types of elements 102. In one embodiment, band 106 is a head band. In other embodiments, band 106 may be a wrist band (e.g., a watch, a bracelet, etc.), an ankle band, an arm band, a leg band, a torso band (e.g., a belt, etc.), or a band to extend about another portion of a user's body.

Referring to FIG. 2C, in other embodiments, feedback device 100 includes an article of clothing, shown as article of clothing 108. As shown in FIG. 2C, article of clothing 108 is a shirt. In other embodiments, article of clothing 108 may be pants, a vest, a jacket, shorts, a sock, a shoe, or a glove. In one embodiment, the plurality of elements 102 are equally spaced about article of clothing 108. In other embodiments, the plurality of elements 102 are selectively positioned around article of clothing 108 so as to correspond in location to desired anatomical features (e.g., chest, back, etc.) of the user. The size of article of clothing 108 may be varied to fit various users and to accommodate various types of elements 102. In further embodiments, feedback device 100 includes a combination of articles of clothing 108, including a shirt, pants, a sock, a shoe, and/or a glove. In yet further embodiments, feedback device 100 includes a combination of devices, including headgear 104, one or more bands 106, one or more articles of clothing 108, display device 70 (e.g., television 72, VR glasses 74, portable device 76, etc.), and/or input device 80 (e.g., controller 82, headset 84, touch sensitive device 86, etc.).

According to an example embodiment, elements 102 may be or include a vibratory element configured to provide haptic feedback (e.g., vibrations, mechanical stimulations, etc.) to a user regarding a secondary object (e.g., a gaze, a proximity, a threat level, etc. of another virtual character, etc.), an event within the electronic game, a physical object near the user of feedback device 100, and/or a condition of the user's virtual character and/or the user. For example, element 102 in some embodiments is or includes a vibration device or similar component configured to provide tactile feedback (e.g., haptic feedback, vibrations, etc.) to a user regarding a secondary object, an event within the electronic game, a physical object near the user of feedback device 100, and/or a condition of the user's virtual character and/or the user. The frequency, amplitude, waveform, and/or other characteristics of vibrations of elements 102 may be varied to provide indications of direction, relative position, relative velocity, absolute velocity, relative acceleration, absolute acceleration, affiliation, threat level, nature, a condition change, an event, an object warning, and the like to the user.

In some embodiments, feedback device 100 includes an audible element such as a speaker (e.g., external speaker, head phones, ear buds, etc.) configured to provide audible feedback (e.g., an audible warning or notification, etc.) to a user regarding a secondary object, an event within the electronic game, a physical object near the user of feedback device 100, and/or a condition of the user's virtual character and/or the user. The speaker may be implemented in any suitable location, and any suitable number of speakers may be utilized. In some embodiments, multiple speakers may be utilized. The speakers may be worn on or within one or both ears of a user, or externally located from the user or feedback device 100 (e.g., television speakers, stereo system speakers, etc.). In one embodiment, the speakers are stereophonic such that a stereophonic warning is provided to users by way of feedback device 100. While in some embodiments the speakers are worn by a user (e.g., on an ear, etc.), in other embodiments, the speakers are carried by another piece of equipment, such as headgear 104, a vehicle, portable device 76, television 72, etc. The pitch, volume, tone, frequency, and/or other characteristics of an audible warning/notification may be varied to provide indications of direction, relative position, relative velocity, absolute velocity, relative acceleration, absolute acceleration, affiliation, threat level, nature, a condition change, an event, an object warning, and the like to the user.

In some embodiments, feedback device 100 includes visual elements such as one or more lights or displays configured to provide visual warnings or notifications to a user regarding a secondary object (e.g., a gaze, a proximity, a threat level, etc. of another virtual character, etc.), an event within the electronic game, a physical object near the user of feedback device 100, and/or a condition of the user's virtual character and/or the user For example, one or more lights (e.g., LEDs, etc.) may be provided within headgear 104 (e.g., to the peripheral side of each eye, etc.). A brightness, a color, a blinking frequency, or other characteristic of the light may be varied to provide indications of direction, relative position, relative velocity, absolute velocity, relative acceleration, absolute acceleration, affiliation, threat level, nature, a condition change, an event, an object warning, and the like to the user. In some embodiments, feedback device 100 includes a combination of feedback elements, including one or more of haptic, audible, visual, and the like.

Feedback device 100 may provide a user of feedback system 10 with enhanced awareness of his/her virtual surroundings such that he/she may provide an input to input device 80 that corresponds with the feedback. For example, the user may provide a touch input and/or motion input to controller 82 to move a virtual character a certain direction, perform a specific task, or the like based on the feedback received. By way of another example, the user may provide a voice command to headset 84 to control the actions of the primary object, provide team members with information regarding enemies (e.g., players on another team, etc.) based on the feedback, and the like based on the received feedback from feedback device 100. By way of yet another example, the user may provide touch sensitive inputs to touch sensitive device 86. The relative locations of touch sensitive device 86 may substantially correspond to the feedback provided by feedback device 100. For example, the user may feel a vibratory sensation on the back of his/her head from headgear 104. The user may associate the location of the haptic feedback on their head to the near side (i.e., the side closest to the user, etc.) of touch sensitive device 86. By touching the corresponding location on touch sensitive device 86, the virtual character may move accordingly. For example, the virtual character may turn towards the inputted direction, begin moving in the inputted direction, or start shooting in the inputted direction, among other alternatives. By way of still another example, feedback device 100 may provide a user of feedback system 10 with enhanced awareness of his/her physical surroundings such that he/she may avoid walking into objects in the physical environment (e.g., when using VR glasses 74, etc.).

In some embodiments, feedback device 100, sensor system 90, input device 80, and/or display device 70 are provided by a single device such that the single device provides both input to processing circuit 30 (e.g., to control the virtual character, etc.) and output/feedback to the user (e.g., to provide enhanced situational awareness, etc.). For example, touch sensitive device 86 may be integrated into headgear 104 such that a user may provide a touch input directly in the location the feedback is experienced. By way of example, if haptic feedback is provided to the temple of the user (e.g., indicating an enemy to their side, etc.), the user may touch the temple location on their head, and touch sensitive device 86 may take appropriate action (e.g., turn in the direction of the touch input, etc.). In some embodiments, feedback devices 100 such as headgear 104, band(s) 106, and/or article(s) of clothing 108 are configured to provide input to feedback system 10 through motion/movement of the user. By way of example, feedback device 100 may include motion sensors that track the movement of a portion of the user (e.g., an arm, a leg, etc.). For example, a user may turn his/her head and headgear 104 may track the motion and provide input such that the virtual character turns or looks accordingly. By way of another example, the user may be wearing bands 106 on his/her wrists such that bands 106 provide input regarding the location of the virtual characters hands/arms based on the movement of the users hands/arms (e.g., such as the motion of the user's arm when throwing a punch in a fighting game, etc.). In some embodiments, sensor system 90 (e.g., via a camera system, etc.), display device 70 (e.g., portable device 76, VR glasses 74, etc.), and/or feedback device 100 (e.g., headgear 104, bands 106, clothing 108, etc.) track the movement of the user. Feedback system 10 may then compare the motion data gathered by sensor system 90, display device 70, and/or feedback device 100 to provide a more accurate input to control movements and actions of the primary object.

Feedback Regarding a Virtual Character

Figure 5:
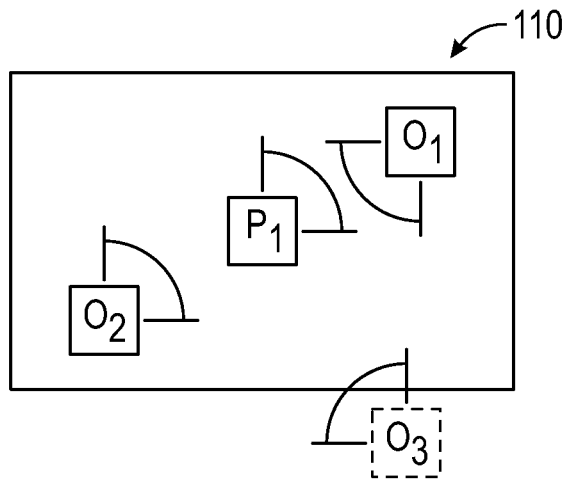
FIG. 5 is a schematic illustration of a primary object in a surrounding virtual environment displayed on a display device, according to one embodiment.

Referring now to FIG. 5, in some embodiments, elements 102 are configured to be selectively and dynamically activated and deactivated based on an orientation of the head of the primary object (e.g., $P_1$, etc.) relative to the secondary object(s) (e.g., $O_1$, $O_2$, etc.). As shown in FIG. 5, secondary objects $O_1$ and $O_2$ are in close proximity (e.g., pose a possible threat, etc.) to primary object $P_1$ within virtual environment 110, while secondary object $O_3$ is not within close proximity (e.g., does not pose a threat, substantially far from primary object $P_1$, etc.). In one embodiment, feedback device 100 provides the user with feedback such that the user has a heightened awareness of the secondary objects and/or threats outside of his/her field of view. For example, as shown in FIG. 5, secondary object $O_2$ is not within the field of view of primary object $P_1$ such that user is not able to see secondary object $O_2$ on display device 70. In other embodiments, feedback device 100 further provides the user with feedback for secondary objects within the user's field of view to reinforce the intuitive understanding of what each vibration (or other feedback signal such as audible or visual) represents as described more fully herein. For example, as shown in FIG. 5, secondary object $O_1$ is within the field of view of primary object $P_1$ such that user is able to see secondary object $O_1$ on display device 70. In one embodiment, feedback device 100 provides the user with feedback when the primary object $P_1$ and a secondary object are not in contact. In some embodiments, feedback device 100 also provides the user with feedback when the primary object $P_1$ and a secondary object are in contact (e.g., a punch or kick hitting the primary object, etc.).

Referring again to FIG. 5, in some embodiments, elements 102 are configured to be selectively and/or dynamically activated and deactivated by control system 20 based on gaze data of a secondary object (e.g., $O_1$, $O_2$, $O_3$, etc.) of an electronic game. The gaze data may include an indication of a gaze direction of a second virtual character relative to a primary object (e.g., $P_1$, etc.). The gaze data may provide an indication to the position and view angle of the secondary objects. The position of a virtual character may be defined by a global coordinate system such as a Cartesian coordinate system (e.g., X position, Y position, Z position, etc.) within virtual environment 110. The view angle of a virtual character may be defined based on the pitch, yaw, and roll of the line of sight of the virtual character, i.e., the deviation of the virtual character's line of sight from "zero" (i.e., straight ahead). Thus, based on the position of the primary object $P_1$ (e.g., X, Y, Z coordinates, etc.), and the position and view angle of the secondary object(s) (e.g., $O_1$, $O_2$, $O_3$, etc.), control system 20 may determine whether the primary Object $P_1$ is in or substantially near being within the line of sight of one or more secondary objects.

In one embodiment, feedback device 100 provides the user with feedback such that the user has a heightened awareness of the secondary objects and/or threats that are looking at and/or within a certain distance of the primary object. For example, as shown in FIG. 5, secondary objects $O_1$ and $O_2$ are in close proximity (e.g., pose a possible threat, etc.) to primary object $P_1$ within virtual environment 110, while secondary object $O_3$ is not within close proximity (e.g., does not pose a threat, substantially far from primary object $P_1$, etc.). Further, as shown in FIG. 5, secondary objects $O_1$, $O_2$, and $O_3$ are looking in the direction of primary object $P_1$. In some embodiments, feedback is provided to a user of the primary object in response to a gaze of a secondary object coming within an angle threshold of the primary object. In some embodiments, the feedback regarding the gaze of a secondary object may provide information such as a distance between the primary object and the secondary object, a directness of the gaze or level of attention (e.g., incidental looking, tracking and following, locked and loaded targeting, etc.), type of secondary object looking (e.g., high threat character, low threat character, etc.), and/or the like. In one embodiment, feedback device 100 provides feedback for any secondary object looking in the direction of the primary object $P_1$. In some embodiments, feedback device 100 does not provide feedback to the user regarding a secondary object within the line of sight of the primary object $P_1$ (e.g., secondary object $O_1$, etc.). In other embodiments, feedback device 100 provides the user with feedback for secondary objects within the user's field of view to reinforce the intuitive understanding of what each vibration (or other feedback signal such as audible or visual) means. In some embodiments, feedback device 100 does not provide feedback to the user regarding a secondary object substantially far from the primary object $P_1$ (e.g., secondary object $O_3$, etc.).

The feedback may be binary (e.g., on or off, etc.). The feedback may be scaled based on the angle between the primary object and the line of sight of the secondary object. Thus, the feedback may indicate more urgency as the line of sight of the secondary object approaches the primary object. The feedback may also be scaled based on a distance between the primary object and the secondary object such that secondary objects closer to the primary object cause increased feedback as compared to secondary objects further from the primary object. The feedback may also vary based on the type of secondary object and/or threat level of the secondary object. The feedback may provide an indication to range and/or bearing to the secondary object through different classes of sensations, different intensities, different frequencies, and/or different pulse patterns. The feedback may also indicate the number of secondary objects looking at the primary object or a certain point or destination.

According to one embodiment, feedback device 100 provides two dimensional information (e.g., left, right, front, back, etc.) to a user regarding the position of the secondary object in relation to the primary object. For example, if the secondary object is behind the primary object (e.g., while looking at the primary object, etc.), feedback device 100 may provide haptic feedback (or another type of feedback) via elements 102 to a rear portion of the user (e.g., back, rear of head, rear of neck, etc.) to make the user aware of the unseen secondary object behind the primary object. In other embodiments, feedback device 100 provides three dimensional information (e.g., up, down, up at an angle, etc.) to the user regarding the position of the secondary object (e.g., looking at the primary object, etc.) in relation to the primary object. For example, if the secondary object is to the side and above the primary object, feedback device 100 may provide haptic feedback via elements 102 to a side portion of the user (e.g., between the top and side of the user's head, etc.). In another example, the feedback system 10 may provide visual feedback via elements 102 by flashing a light in the users peripheral vision (e.g., on the side the secondary object is located, etc.) or emitting an audible tone in an ear corresponding to a location of the secondary object with respect to the users view of the virtual environment (e.g., emitting an audible tone in the right ear of a user when a secondary object is located somewhere on the right side of the users view of the virtual environment, etc.).

According to an example embodiment, elements 102 of feedback device 100 provide metadata denoting situations within the electronic game (e.g., not only directional information based on position and/or gaze direction, etc.). By way of example, feedback module 60 may be configured to vary the frequency, amplitude, waveform, etc. of an output (e.g., vibrations, sounds, lights, etc.) of elements 102 to provide indications of different types of information to the user regarding the primary object and/or the secondary object based on the first data, the second data, the condition data, the display data, the object data, and/or the event data. In one embodiment, elements 102 denote a change in relative position between the primary object and the secondary object. In further embodiments, the feedback is configured to provide an indication of a relative distance, a relative velocity, an absolute velocity, a relative acceleration, and/or an absolute acceleration between the primary object and the secondary object. For example, the frequency of vibratory feedback may be increased or decreased with the relative velocity of the secondary object (e.g., another user controlled character, computer controller character or object, etc.), and the amplitude of the vibratory feedback may be increased or decreased with the relative distance between or proximity of potentially threatening objects. As such, in one embodiment, as the relative velocity between the primary object and the secondary object increases and/or the distance decreases, the vibratory feedback may increase in frequency and amplitude. Conversely, should the user take action to avoid the secondary object (e.g., by slowing down, changing direction, etc.) to decrease the relative velocity between users and/or increase the distance, the vibratory warning may decrease in frequency and amplitude. The same may be true for audible and/or visual feedback.

In yet further embodiments, the feedback is configured to provide an indication of an affiliation and/or a threat level/nature of the secondary object. For example, non-threatening objects (e.g., allies, teammates, etc.) may be ignored (e.g., no feedback is provided, etc.). On the other hand, threatening objects (e.g., enemies, players on other team, opponents, etc.) may cause control system 20 to provide feedback to the user via feedback device 100. Likewise, the feedback may vary in amplitude, frequency, waveform, etc. based on a threat intensity. For example, a high threat object (e.g., a boss character, a high skilled player, etc.) may cause a more frequent and higher amplitude vibratory, audible, and/or visual response from elements 102. Conversely, a low threat object (e.g., low skilled player, minion, etc.) may cause a less frequent and lower amplitude vibratory, audible, and/or visual response. In some embodiments, feedback device 100 further provides the user with various intensities of feedback based on the direction between the primary object and the secondary object relative to an orientation of the primary object and/or an orientation of the secondary object. For example, a secondary object may be classified as a high threat object if the secondary object is looking at the primary object or a low threat object if the secondary object is looking away from the primary object. As another example, a secondary object may be classified as a high threat object if the primary object is not looking at the secondary object or a low threat object if the primary object is looking at the secondary object.

In some embodiments, feedback device 100 is configured to provide directional information to the user. In one embodiment, the directional information indicates a proposed direction of movement of the primary object. By way of example, in a racing game, feedback device 100 may provide directional cues to notify the user of an upcoming turn in a race track. By way of another example, feedback device 100 may provide the user with feedback to propose a direction of travel such that the user leads a virtual character along a certain path, towards a secondary object, and/or away from a threat, among other possibilities. In other embodiments, the directional information indicates a direction of virtual gravity. For example, in some games, a virtual character may become disoriented (e.g., from an explosion, etc.) and not be able to gain bearing for a certain amount of time. In this instance, feedback device 100 may provide directional cues to reorient the user of the virtual character with virtual environment 110 (e.g., such as the direction of virtual gravity, etc.). In an additional embodiment, the directional information provides an indication of a specific point or locations of interest. For example, the points may be static points such as a home base or planet, or the points may be moving such as targets (e.g., enemies, etc.) that the user may be tracking or being tracked by. The static points may be valuable during combat or other types of play to orient the user with where the user is headed or with what the user is guarding during moments of disorientation.

In some embodiments, feedback system 10 is configured to recognize boundaries within virtual environment 110 and provide feedback through feedback device 100 based on the respective boundary. For example, feedback device 100 may warn a user of an upcoming cliff or obstacle within virtual environment 110. By way of another example, feedback device 100 may lead a user to a doorway or passage within the virtual environment. By way of yet another example, feedback device 100 may recognize and notify a user of walls or virtual boundaries (e.g., such as in dark caves, holorooms, etc.) that the user may or may not be able to see.

According to an example embodiment, elements 102 are configured to be selectively and/or dynamically activated and deactivated by control system 20 based on condition data. The condition data may provide an indication of a condition (e.g., health, power, shield, etc.) of the virtual character of a user within an electronic game. Feedback system 10 may be configured to provide an indication to the user that the health, armor, or other condition of the virtual character is declining below a threshold value while in the virtual environment (e.g., critical health, percentage of health lost, etc.). This may substantially eliminate the need for the user to look at visual indications of these conditions on a user interface (e.g., monitor, television, etc.), which facilitates quicker and appropriate reactions. The feedback regarding the condition of the virtual character may be any of a tactile notification, a visual notification, and/or an audible notification. The tactile notification may be a throb, a buzz, a tap, and/or a pulse. The feedback may encode information about which condition of the virtual character is declining, what the current level of the condition is (e.g., critical health, etc.), and/or how much time or damage that can be inflicted before a condition reaches a critical level.

In some embodiments, feedback system 10 monitors the status of a user's team or enemy team and relays information regarding the status to each user. For example, feedback system 10 may provide feedback to a user when a player is killed via feedback device 100. In one embodiment, feedback device 100 provides haptic feedback to inform the players of how many players are alive or dead via a number of vibrations. In other embodiments, the feedback may be an auditory message (e.g., such as "player X has been killed", "five players remain", etc.).

Parameters in which the feedback is provided to a user may be modified by at least one of the user based on preference and control system 20 based on a chosen difficulty setting (e.g., easy, medium, hard, etc.), according to an example embodiment. For example, a range (e.g., distance, etc.) in which the user is first alerted of a secondary object may be altered via a user chosen setting or predefined by the game difficulty selected by the user. Similarly, the user may choose the type of objects for which to be alerted about (e.g., enemies, friendlies, based on threat level, nature, etc.). In one embodiment, a squelch function is used to tune out (e.g., suppress, etc.) excess noise (e.g., non-threatening objects, etc.).

According to an example embodiment, elements 102 of feedback device 100 (e.g., haptic elements, visual elements, audible elements, etc.) are selectively and/or dynamically activated and deactivated by control system 20 based on conditions or settings within the game corresponding with the event data and/or actions taken by the primary and secondary object (e.g., indicated by the first data and the second data, etc.). The use and/or availability of feedback with a game may be controlled by control system 20 responsive to the event data, the first data, and/or the second data.

In some embodiments, the availability of feedback is based on the game level/situation or a change thereof. By way of example, feedback may be disabled or scrambled (e.g., false feedback provided, miscalibrated, etc.) by control system 20 during a portion of a game to increase the difficulty. By way of another example, feedback may be disabled during a situation where the primary object (e.g., virtual character) becomes disoriented (e.g., from a flash bang grenade in a war game, etc.). By way of yet another example, as the user progresses through the game and reaches new checkpoints, milestones, and/or levels, the availability of the feedback may change (e.g., decrease, increase, etc.). For example, feedback may be disabled or hindered during a portion of the game when the primary object controlled by the user is facing a boss character or a character with a feature/ability/perk to disable/hinder feedback abilities.

In some embodiments, the availability of feedback is based on a primary object's or a user's experience, performance, and/or skills. For example, a virtual character with better attributes (e.g., strength, speed, aim, etc.), perks (e.g., special weapons, powers, etc.), and/or skills than other virtual characters may not be compatible with a feedback feature. In another example, a user may be rewarded the ability to activate feedback based on a level of skill (e.g., reaching a certain rank, level, prestige, etc.). In other embodiments, the availability of feedback is based on the performance of other users or secondary objects within the game. For example, if a secondary object is outperforming the primary object, the user of the primary object may be allowed to implement feedback capabilities, while the user of the secondary object may have feedback capabilities reduced or disabled.

In some embodiments, the availability of feedback is based on a current virtual environment. By way of example, feedback may be disabled in a harsh environment of the electronic game (e.g., during a storm, in a dark cave, etc.). In additional embodiments, the availability of feedback is based on a difficulty setting of the game. By way of example, a user playing a game on a relatively easy setting may be provided substantial amounts of feedback to enhance their awareness within the game and aid in the reduction of the difficulty. While a user playing a game on a relatively difficult setting may be provided with minimal amounts of feedback or none at all to increase the difficulty.

In some embodiments, the availability of feedback is based on the purchase or acquisition of feedback within the game or from a game marketplace (e.g., an app store, etc.). For example, feedback may be treated like a special item or skill that is purchasable (e.g., via points or virtual money earned during game play, etc.) within the game to increase the awareness of the virtual character (i.e., the user of the virtual character) regarding the surrounding virtual environment and secondary objects. In another example, feedback may require an additional purchase not included with the game from a store (e.g., an electronics retail store, etc.) or online game marketplace.

In some embodiments, the availability of feedback is based on an operational mode of feedback device 100 (e.g., on, off, an active state, an inactive state, etc.). According to an example embodiment, feedback device 100 is operable in a first mode of operation (e.g., an active state, an on state, etc.) and a second mode of operation (e.g., an inactive state, a standby state, an off state, etc.). In one embodiment, the first operational mode and/or the second operational mode indicate a specified sensitivity setting for feedback device 100. The specified sensitivity setting may be user defined or processor controlled. The specified sensitivity setting may indicate an amount of feedback output for a given input (e.g., distance based, threat based, etc.). In another embodiment, the first operational mode and/or the second operational mode indicate a specified event responsiveness for feedback device 100 (e.g., an amount of feedback for certain events or situations, etc.). In other embodiments, the first operational mode and/or the second operational mode indicate a specified feedback presentation for feedback device 100 to provide to a user (e.g., visual, audible, or tactile feedback; a frequency, amplitude, etc.). In some embodiments, the first operational mode and/or the second operational mode indicate a specified availability for feedback device 100 to provide feedback to a user.

In one embodiment, the operational mode of feedback device 100 is controlled by a user (e.g., by pressing an on/off button, etc.). In another embodiment, the operational mode of feedback device 100 is controlled by control system 20. Control system 20 may be configured to reconfigure feedback device 100 between the active state and the inactive state based on at least one of the event data, the first data, user data, and the second data (as described above with regards to the availability of the feedback). In one embodiment, the possession, settings, or operational mode of feedback device 100 is represented within an electronic game by a tertiary object (e.g., an item the user may pick up or obtain with the primary object, etc.). For example, control system 20 may activate feedback capabilities in response to a user obtaining a certain item (representing the activation of feedback device 100) within a game.

In some embodiments, feedback device 100 is controlled by control system 20 to operate better (e.g., be more sensitive to surroundings, etc.) for some primary or secondary objects than others. For example, some enemies (e.g., other players, virtual characters, etc.) may not be detected as well as others, such as ninjas or leopards. In one embodiment, a user is able to purchase or acquire an invisibility/sneakiness skill or ability for a primary object such that an opponent's feedback device 100 does not notify the opponent of the user's primary object. In another embodiment, a user is able to purchase or acquire a disruption skill for a primary object such that an opponent's feedback device 100 provides false feedback (e.g., provides corrupt directional feedback, introduces fake objects, etc.) to the opponent. In still another embodiment, a user may choose to use another character's perspective (e.g., of a teammate or opponent with or without permission, etc.). For example, a user may use a teammate's virtual character's perspective to gain a greater awareness of threats ahead or in another location of the virtual environment. In some embodiments, the availability of feedback is based on any combination of the aforementioned event data and/or characteristics (e.g., a level, a situation, a difficulty setting, a current virtual environment, a performance level or characteristic of the user, a performance level or characteristic of other users, an operational mode of feedback device 100, etc.).

According to yet another example embodiment, processing circuit 30 is configured to control the operation of elements 102 to provide a sense of at least one of a presence, a distance, and a direction of an object relative to the user of feedback device 100. The feedback may be based on at least one of a distance of an object (e.g., secondary object, another person, etc.) relative to the user (or primary object), a direction of the object relative to the user, a nature/threat level of the object, and a user response to previously-provided feedback. The feedback provided by elements 102 may include, but are not limited to, a vibration, a stroke or swipe, an acoustic stimulation, a visual stimulation, a temperature change, a moisture change, a lubrication, and/or an electrical stimulation. The vibration may be provided by a vibratory element. The stroke or swipe may be provided by a plurality of vibratory elements actuated in succession, simultaneously, and/or in a specific pattern (e.g., the vibratory elements are arranged in a linear pattern such that each may provide vibratory feedback to a user along the pattern, etc.). The temperature change may be provided by a heating/cooling element (e.g., a resistive heating element, a heating element that utilizes a chemical reaction, a fan, etc.). The moisture or lubrication may be provided by a nozzle attached to a fluid reservoir (e.g., a water tank, etc.) or a humidifying material or device. The electrical stimulation may be provided by a device configured to provide electrical impulses (e.g., electrical muscle stimulation, etc.).

In one embodiment, the feedback is derived from, modulated by, and/or accompanied by audio information. By way of example, using audio information, feedback device 100 may provide a user with feedback derived from the audio information indicating where a sound is coming from. By way of another example, in a situation where music within an electronic game changes, processing circuit 30 may modulate the feedback based on the music. For example, a change in the background music may indicate an intense or more difficult portion of the electronic game is occurring, where processing circuit 30 may adjust the feedback based on the situation. By way of yet another example, the feedback may be provided in the form of or accompanied by an audio output (e.g., audible feedback, from a speaker, etc.), as described above. The audio information may include a musical score, a tone, a notification, etc. In another embodiment, the feedback is accompanied by visual information supplied to the user of feedback system 10 or visual information is withdrawn from the user. By way of example, feedback device 100 may include a visual element, such as an LED light, configured to provide visual feedback. By way of another example, processing circuit 30 may provide a visual indication on display device 70 or remove the visual indication from display device 70. For example, processing circuit 30 may provide visual feedback in the form of a message (e.g., a warning, an update, etc.) or direction arrow (e.g., indicating a direction of an object, etc.) on display device 70.

Feedback Derived from Outputs of an Electronic Game

In some embodiments, feedback system 10 uses multi-channel audio data or information to localize the origin of sounds in a game and converts the sound information to feedback (e.g., haptic feedback, etc.) that indicates the virtual spatial location of the audio to the user. Feedback device 100 may connect (via any suitable wireless or wired protocol) to an audio output of feedback system 10 (e.g., a game console, a computer, a smart phone, a tablet, an audio receiver, etc.) and obtain three-dimensional audio information. Multi-channel audio operates by varying the intensity and timing of sounds to create the illusion that the sounds are being generated from a specific spatial location relative to the hearer. Feedback system 10, via processing circuit 30, may interpret raw multi-channel audio data and determine where sounds are arising from relative to the user. Processing circuit 30 may then convert the audio data into feedback to help the user better identify where the sounds are coming from. In turn, processing circuit 30 is configured to provide, for example, haptic feedback to a user via feedback device 100 to indicate specific range, elevation, and/or bearing information that may be substantially easier to interpret than audio coming from headphones or a surround sound system. This may be particularly useful in an electronic game that outputs multi-channel (e.g., 5-channel, 7-channel, etc.) audio where the user is only using stereo headphones. Converting the multi-channel audio information into haptic feedback may substantially increase a user's competitive advantage in the electronic game. The user may be able to more quickly identify, for example in a first-person shooter game, where shots are coming from than if the user were solely using the stereo headphones. For example, if a virtual character is being shot at in a first-person shooter game, and the user cannot locate where it is coming from, feedback device 100 may provide the user with haptic feedback to allow the user to identify the origin (e.g., the location relative to the virtual character, etc.) of the sound (e.g., a gunshot, etc.). This also facilitates the integration of feedback system 10 with an electronic game without the source code of the electronic game supporting feedback system 10.

In some embodiments, a similar concept may be generalized to convert many different types of in-game information into feedback. For example, many electronic games display a "bird's eye view" map, showing the location and/or orientation of the primary object, team members of the user of the primary object, and/or secondary objects (e.g., opponents, enemies, etc.) within a virtual environment. Processing circuit 30 may interpret this visual information and convert it to feedback, thereby not requiring the user to actually look at the in-game map. There are numerous other features expressed visually within an electronic game that may also be converted to feedback to be provided to a user of feedback system 10.

In one embodiment, a portable device (e.g., a mobile phone, smartphone, tablet, a laptop, a camera enabled device, portable device 76, etc.) includes and/or operates a computer vision or machine vision application (e.g., stored in memory of the portable device and controlled by a processing circuit of the portable device, etc.) that uses a sensor (e.g., a camera or other sensor, portable device sensor 96, etc.) of the portable device. The machine vision application is communicably and operatively coupled to the sensor to monitor and/or observe particular user interface (UI) features of the electronic game displayed on display device 70. The UI features may include features such as a virtual environment, a radar, a map, a primary object, a secondary object, and/or other display features or symbols that symbolically provide representations of information (e.g., location, movement, affiliation, display data, etc.) regarding secondary objects (e.g., other players, teammates, enemies, obstacles, etc.). The machine vision application may be configured to interpret the UI features and/or symbols and selectively communicate the information from the UI features to feedback device 100. Feedback device 100 may then provide the information to the user through haptic, visual, and/or audible feedback.

The information from the UI features may be provided to a wearer of feedback device 100 through a tactile output, a visual output, an audio output, or a combination thereof. For example, the sensor of the portable device and the machine vision application may determine that a secondary object (e.g., a virtual enemy, etc.) is coming up behind the primary character of the user in a virtual environment. In this case, the output may be an audio indication such as, but not limited to, an audible output providing the phrase "Behind you!", "At your six," or the like. Alternatively, the audible output may be used in conjunction with a tactile output which may more accurately indicate where the secondary object is (e.g., relative to the primary object or character, etc.) or may indicate some other characteristic about the secondary object (e.g., speed, type, threat level, affiliation distance, etc.).

In some embodiments, the machine vision application may be configured (e.g., programmed and/or tuned, etc.) for specific electronic game titles, electronic game types (e.g., first person shooters, third-person shooters, racing, turn-based, sports, etc.), game consoles (e.g., PC, Xbox®, Play Station®, Nintendo®, etc.), and/or styles of different electronic game developers. In some embodiments, the machine vision application is configured to automatically recognize (e.g., detect, identify, etc.) the electronic game that the sensor is monitoring (e.g., trying to interpret, etc.) based on the UI features on the display of display device 70. The machine vision application may be further configured to implement feedback settings and/or parameters specifically designed for the particular electronic game detected (e.g., user defined according to preference and/or difficulty, predefined within the machine vision application, etc.). In other embodiments, the machine vision application is configured to prompt a user to input an identifier (e.g., title, etc.) indicative of the electronic game he or she desires to use the machine vision application with (e.g., via a drop down menu and/or fill in box provided by a graphical user interface of the machine vision application of portable device 76, etc.). In some embodiments, the machine vision system may use a generalized setting when the machine vision application is presented UI features (e.g., which are presented on the display to the sensor of the portable device, etc.) that the machine vision application may not necessarily be preprogrammed for or recognize. Further, in some embodiments, the machine vision application is configured to adaptively learn (e.g., through machine learning techniques, etc.) unfamiliar or unknown virtual environments that are presented before the sensor of the portable device, such that when presented with the same virtual environment on multiple occasions, the machine vision application may improve performance over time (e.g., an adaptive or continuing learning application, such that unknown virtual environments become known and stored in memory for subsequent use, etc.).

Figure 6:
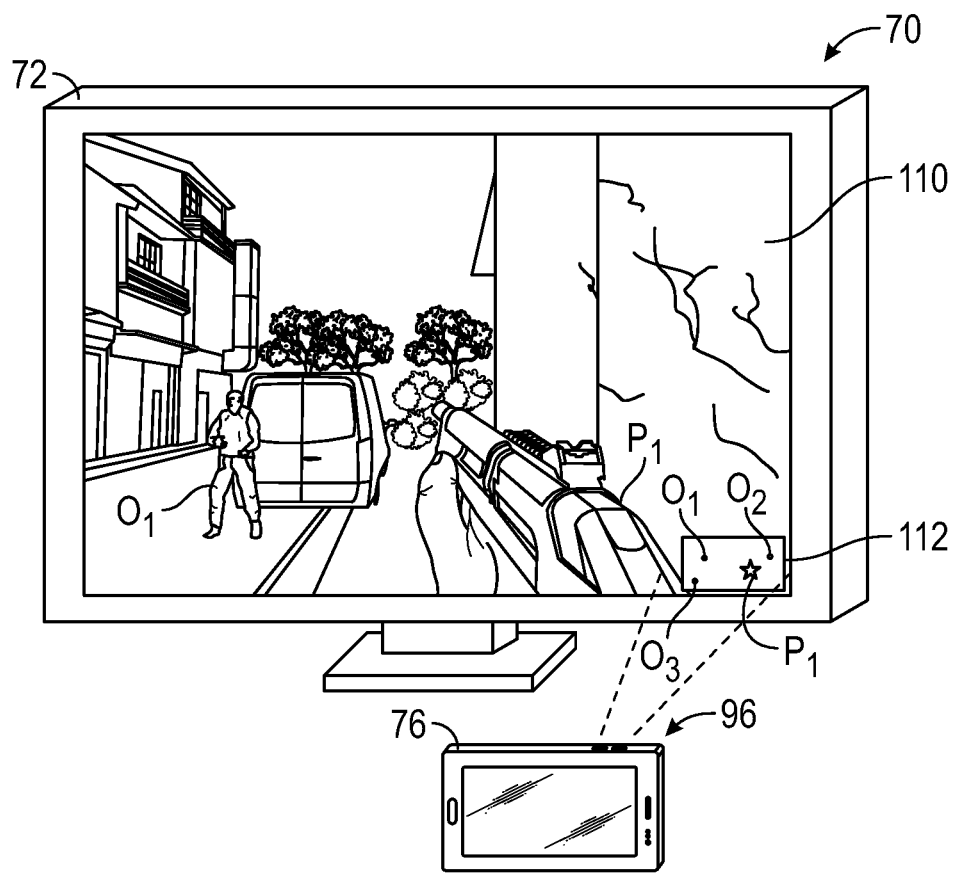
FIG. 6 is an illustration of an electronic device acquiring information from a virtual display of a display device, according to one embodiment.
Figure 7:
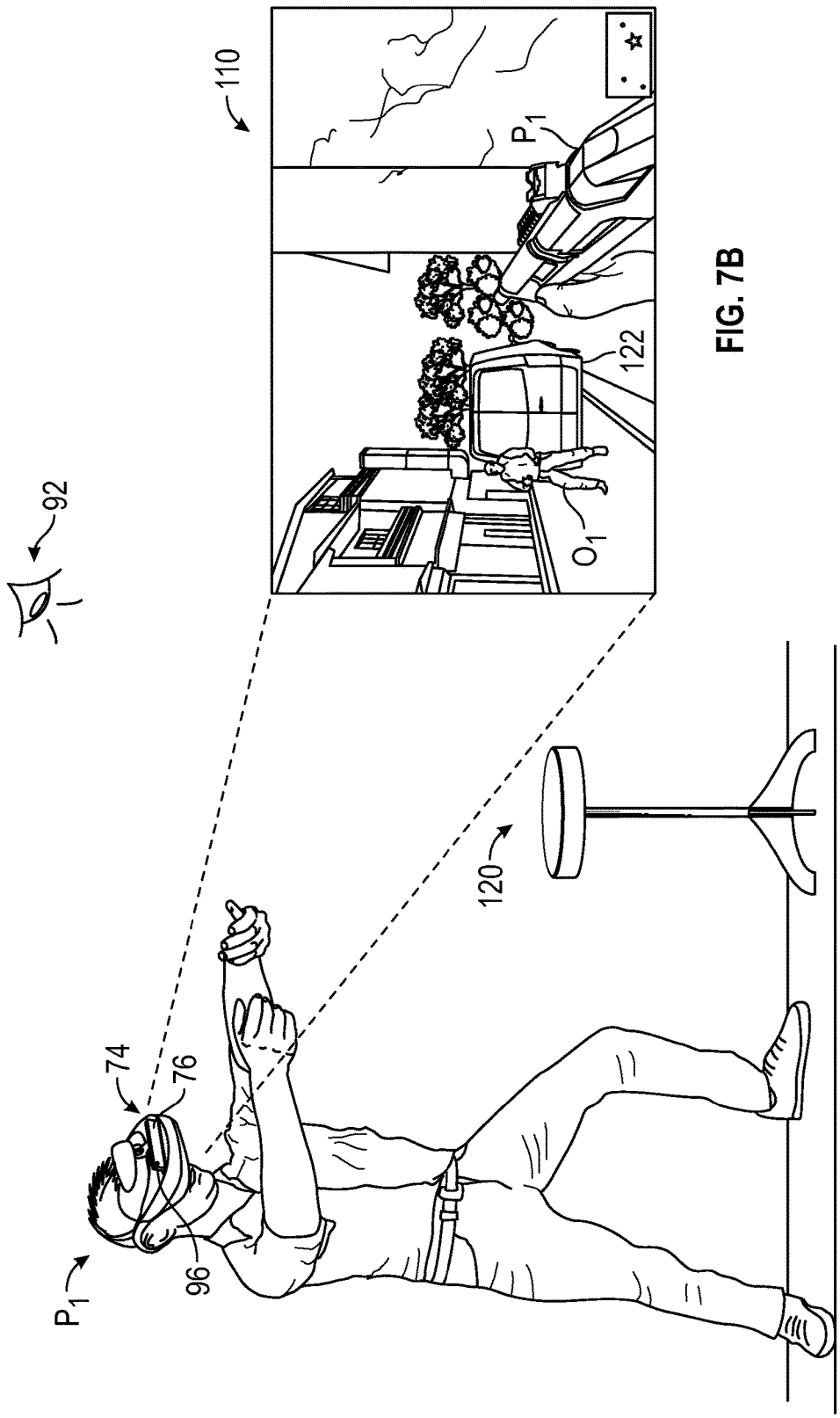
FIGS. 7A-7B are illustrations of a user of a feedback system in a physical environment and a corresponding virtual environment displayed by a display device of the feedback system, according to one embodiment.

Referring now to FIG. 6, portable device 76 may be used to facilitate the integration of feedback system 10 with an electronic game without the source code of the electronic game supporting feedback system 10. For example, feedback may be provided to a user of an electronic game via the feedback system 10 without the feedback system 10 having to be directly connected to the electronic game, without the software of the electronic game having to be altered to support the feedback system 10, and/or via a user's personal portable device(s) 76 (e.g., smartphone, tablet, laptop, webcam, other camera enabled device, etc.). Therefore, feedback may be provided from a feedback system 10 that is completely external from (e.g., not connected to, may or may not be supported by, not in communication with, etc.) the electronic game and display device 70.

As shown in FIG. 6, portable device 76 may be positioned such that portable device sensors 96 (e.g., a camera device, etc.) is able to acquire information and/or display data from virtual environment 110 currently being displayed by display device 70, such as television 72 or other display devices (e.g., a monitor, a projection screen, etc.). According to one embodiment, portable device sensors 96 of portable device 76 are insensitive to the precise orientation of portable device 76. Portable device 76 may thereby acquire the display data from virtual environment 110 irrespective of the orientation (e.g., tilt angle, view angle, etc.) of portable device 76 relative to display device 70 (e.g., as long as portable device sensor(s) 96 have some line of sight of virtual environment 110, etc.).

Virtual environment 110 may include various display data that provide indications regarding the current location of the primary object $P_1$ (e.g., within a map, virtual world, etc.), surrounding virtual objects (e.g., secondary objects, houses, buildings, vehicles, geographical landscapes, etc.), a direction of travel (e.g., of the primary object, of one or more secondary objects, etc.), a rate of travel (e.g., velocity, acceleration, of the primary object, of one or more secondary objects, etc.), range information (e.g., between the primary object and one or more secondary objects, etc.), bearing information (e.g., between the primary object and one or more secondary objects, etc.), affiliation information (e.g., of one or more secondary object, etc.), threat level information (e.g., of one or more secondary objects, etc.), attribute information (e.g., of one or more secondary objects, etc.), a gaze direction (e.g., of the primary object, of one or more secondary objects, etc.), etc.

As shown in FIG. 6, virtual environment 110 may also include a bird's eye view map, shown as radar map 112 (e.g., located in a corner of the display, etc.). Radar map 112 may display the location and/or orientation of the primary object $P_1$, team members of the user of the primary object $P_1$, and/or secondary objects (e.g., opponents, enemies, $O_1$, $O_2$, $O_3$, etc.) relative to each other within virtual environment 110. Radar map 112 may provide display data including relative positions (e.g., of primary object $P_1$ to secondary objects $O_1$, $O_2$, etc.), range and/or distance (e.g., between primary object $P_1$ to secondary objects $O_1$, $O_2$, etc.), and/or bearing (e.g., between primary object $P_1$ to secondary objects $O_1$, $O_2$, etc.), among other possibilities.

According to one embodiment, portable device 76 is configured to acquire the display data from the display of virtual environment 110 and/or radar map 112 with portable device sensors 96. According to an example embodiment, portable device 76 enables a user of an electronic game to acquire the display data for feedback purposes (e.g., haptic, audible, visual, etc.) without requiring the purchase of additional hardware components (e.g., the user may utilize commonly owned camera enabled portable electronic devices, etc.). In one embodiment, portable device 76 includes processing circuitry (e.g., such as processing circuit 30, an application stored within the memory of portable device 76, etc.) configured to analyze the display data. Therefore, portable device 76 may include at least a portion of sensor system 90 (e.g., portable device sensors 96, etc.) and at least a portion of control system 20 such as processing circuit 30, sensor module 50, and/or feedback module 60. In other embodiments, portable device 76 is configured to provide the display data to an external control system 20 for further processing and analysis (e.g., portable device 76 acts as at least a portion of sensor system 90 only, etc.) for feedback purposes as described above.

Acquiring display data from at least one of virtual display 110 and radar map 112 allows feedback to be provided when secondary objects may or may not be visible to the user, visible to the primary object, and/or on the screen of display device 70. For example, feedback may be provided when a secondary object is not visible within virtual environment 110 but is visible on radar map 112 (e.g., secondary objects $O_2$ and $O_3$, etc.). In another example, feedback may be provided when a secondary object is visible within virtual environment 110 to the primary object and/or the user (e.g., secondary object $O_1$, etc.).

According to an example embodiment, portable device 76 is configured to acquire the display data in real-time and communicate with feedback device 100 to provide feedback to the user of the electronic game. Portable device 76 may communicate with feedback device 100 using any suitable wired and/or wireless communications protocols. Portable device 76 may interpret (e.g., analyze, etc.) the display data to provide various feedback commands (e.g., haptic, visual, audio, etc. feedback) to feedback device 100 based on the display data. The feedback commands may provide indications to the user of feedback device 100 regarding position, range, bearing, velocity, among other possibilities, of secondary objects (e.g., opponents, enemies, threats, etc.) relative to the primary object $P_1$ controlled by the user. Thus, the user may not need to focus on the radar map 112 and/or peripheral areas of virtual environment 110, thereby increasing the user's competitive advantage in the electronic game (e.g., the user is able to focus on a more important task, on the environment ahead, etc.).

Feedback Regarding a User of a Virtual Character

Referring now to FIGS. 7A-7B, feedback system 10 may be configured to provide feedback to the user of an electronic game based on object data. The object data may provide an indication to a location, size, a proximity/distance, and/or a velocity of a physical object relative to the user and/or other characteristics of the physical object relative to the user in the physical environment. This may be particularly useful in situations where a user is playing an electronic game where he/she is physically moving (e.g., walking around, etc.) while wearing a display device, such as VR glasses 74, that at least partially obstructs the user's view of the surrounding physical environment.

As shown in FIG. 7A-7B, user $P_1$ is wearing VR glasses 74. In one embodiment, VR glasses 74 include portable device 76 disposed therein (e.g., within portable device retainer 78, etc.) or detachably attached thereto (e.g., an exterior wall thereof, via portable device retainer 78, etc.). In other embodiments, VR glasses 74 do not include portable device 76 or facilitate the coupling of portable device 76 thereto. In one embodiment, VR glasses 74 provide a display of virtual environment 110 that the virtual character of user $P_1$ is within. In other embodiments, portable device 76 provides a display of virtual environment 110 that the virtual character of user $P_1$ is within. As shown in FIG. 7A, VR glasses 74 and/or portable device 76 at least partially obstruct the user's view of the surrounding environment such that the user $P_1$ may be unaware of physical objects, such as object 120 (e.g., a wall, a stool, a piece of furniture, stairs, other hazard, other people, etc.), as he/she walks around the surrounding environment to navigate throughout virtual environment 110.

As described above, sensor system 90 is configured to acquire the object data regarding objects 120 located within the physical environment surrounding the user of feedback system 10 such that feedback device 100 may provide feedback to the user regarding objects 120 (e.g., elements 102 are selectively and/or dynamically activated and deactivated by control system 20 based on the object data, etc.). Sensor system 90 may also be configured to track movement of the user to correspond with movement and/or actions taken by the virtual character within virtual environment 110. Sensor system 90 may include an external sensor system including sensors, shown as external sensors 92, positioned throughout the physical environment, sensors position within or disposed on feedback device(s) 100 (e.g., user sensors 94, etc.) and/or display device 70 (e.g., VR glasses 74, etc.), and/or portable device sensors 96 of portable device 76. External sensors 92 may include, but are not limited to, personal security cameras, webcams, game console cameras (e.g., Kinect, etc.), computer and/or laptop cameras, and/or other sensors positioned within a user's residence or gaming area to monitor a user and/or a physical environment. The sensors of VR glasses 74 and/or portable device sensors 96 of portable device 76 may include a still camera, a video camera, a gyroscope, an accelerometer, a compass, a proximity sensor, a radar, a lidar, and/or still other sensors. Sensor system 90 may include any combination of VR glasses sensors, user sensors 94, portable device sensors 96, and external sensors 92. In some embodiments, multiple sensors create a network of sensors that are used to generate a 3D image of the user and the surroundings to increase the feedback capabilities and accuracy of the feedback system 10.

The feedback provided by feedback system 10 regarding object 120 may provide an indication that user $P_1$ is nearing object 120. The feedback may encode information such as a range, bearing, and/or an anticipated time until a collision (e.g., based on the relative position and velocity, etc.) between object 120 and user $P_1$. The feedback may provide the information through different classes of sensations (e.g., tactile, audible, visual, etc.), different intensities, different frequencies, and/or different pulse patterns. Further, feedback system 10 may provide vestibular stimulation which may cause the head of the user to bob or recoil to indicate that he/she is about to run into an object. Thus, the feedback may substantially prevent user $P_1$ from walking into objects 120 while walking around and immersed within virtual environment 110.

As shown in FIG. 7B, feedback system 10 may insert an associated virtual representation of object 120 into virtual environment 110, shown as virtual object 122. Virtual object 122 may be positioned within virtual environment 110 to correspond with the position of object 120 relative to user $P_1$ within the physical environment. Virtual object 122 may be inserted as a virtual indication to represent object 120, but the appearance of virtual object 122 may be based on the electronic game being played (e.g., the physical appearance of virtual object 122 may not resemble object 120, etc.). For example, in a war game, virtual object 122 may be a tank or other vehicle, a missile, a fence, a building wall, etc.; while in an adventure game, virtual object 122 may be a tree, a boulder, a river, etc. In other embodiments, virtual object 122 is a substantially identical virtual representation of object 120. Virtual objects 122 may be inserted into virtual environment 110 in real-time or prior to game play (e.g., using the pre-scanning method described above, etc.). Inserting virtual objects 122 into virtual environment 110 may provide a seamless gameplay experience such that the user may react to virtual objects 122 as if he/she could see objects 120 in the physical surroundings. Thus, the display of virtual objects 122 within virtual environment may substantially prevent user $P_1$ from walking into objects 120 within the physical environment.

Feedback system 10 may also be able to monitor the condition of the user of the virtual character (e.g., based on condition data, etc.) using various sensors positioned around the physical environment (e.g., external sensors 92, etc.) and/or embedded on/within the component of feedback system 10 (e.g., feedback device 100, display device 70, etc.). Thus, sensor system 90 may acquire condition data indicative of a condition of the user. For example, feedback system 10 may be configured to monitor conditions of the user such as heart rate, breathing patterns, temperature, sleeplessness/alertness, time of game play, SpO2 levels, glucose levels, hydration levels, and/or other conditions that may be affected by extended or intense game play. Feedback system 10 may be configured to provide feedback to the user regarding his/her physical condition (e.g., changes thereof, condition readings exceeding or falling below a threshold value, etc.) such that the user may take appropriate action (e.g., stop playing, get some sleep, eat some food, drink some fluids, etc.).

Real-World Feedback System

According to the example embodiment shown in FIGS. 1 and 8-10C, feedback system 10 (e.g., situational awareness system, etc.) is configured to provide feedback for real-world applications. For example, feedback system 10 may be used for driving, treatment for sight or hearing-impaired persons, aviation, sports, combat, construction, etc.

Figure 8:
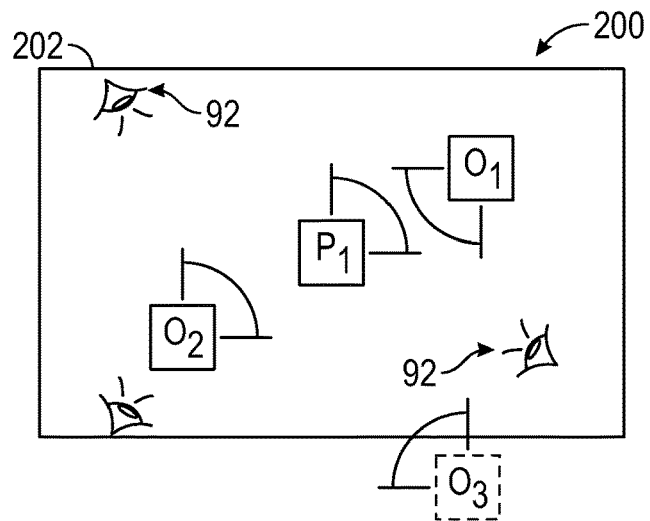
FIG. 8 is a schematic illustration of a user of a feedback system in a physical environment/area, according to one embodiment.

Referring now to FIG. 8, area 200, usable in connection with feedback system 10, is shown according to one embodiment. As shown in FIG. 8, area 200 includes a ground surface 202 upon which a user, such as user $P_1$ (e.g., an athlete, a motor vehicle operator, a military personnel, construction worker, etc.), is moving. In some embodiments, user $P_1$ is participating in an athletic event (e.g., a paintball game, football game, an automotive race, etc.) where opponents (e.g., other users, other vehicles, etc.), such as opponents $O_1$, $O_2$, and $O_3$, or other obstacles (e.g., walls, posts, vehicles, etc.) are present.

In one embodiment, area 200 includes one or more external sensors 92 (e.g., remote sensors, etc.) configured to acquire external data (e.g., second data, etc.), gaze data, and/or environment data. External sensors 92 may be positioned around or within area 200, and configured to acquire various data regarding area 200, the user $P_1$, and/or opponents $O_1$, $O_2$, and $O_3$. External sensors 92 may include any suitable sensors configured to detect the position, movement (e.g., velocity, acceleration, etc.), gaze direction, identity (e.g., team affiliation, etc.), etc. of the user $P_1$ and/or opponents $O_1$, $O_2$, and $O_3$. As discussed in further detail below, additional sensors may be worn by user $P_1$ (e.g., as part of a head protection device, torso protection device, leg protection device, one or more head, wrist or ankle bands, as part of a team uniform, etc.) and used to acquire data regarding various users, objects, and/or a surrounding area.

Figure 9:
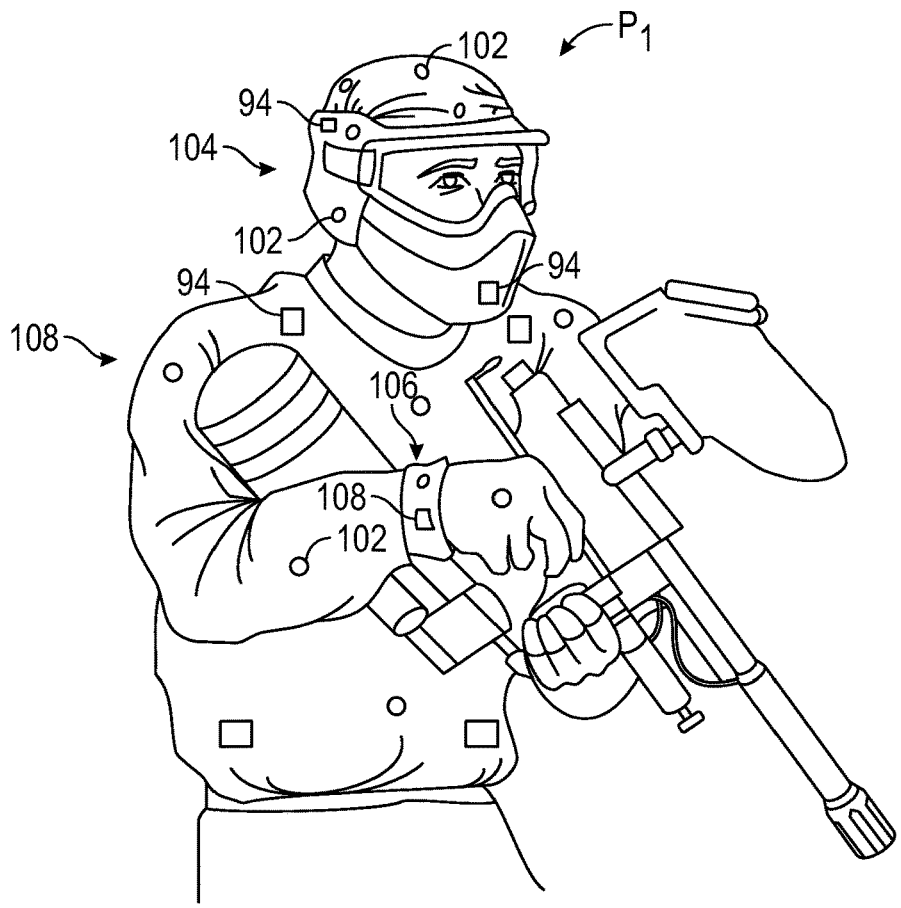
FIG. 9 is an illustration of a user of a haptic system, according to one embodiment.

Referring now to FIG. 9, user $P_1$ is a paintball player. In other embodiments, user $P_1$ may be a racecar driver, a football player, a soldier, a construction worker, a surgeon, or another person using feedback system 10. As shown in FIG. 9, user sensors 94 are configured to be worn by, carried by, or travel with a user such as user $P_1$. User sensors 94 may be positioned at various locations about one or more pieces of equipment or clothing worn by user $P_1$. In one embodiment, user sensors 94 are provided in or on headgear 104 (e.g., a helmet, a head protection device, etc.). In some embodiments, user sensors 94 are provided on one or more articles of clothing 108 or bands 106, such as a uniform, jersey, shirt, pants, belt, or a head or wrist band, etc. In some embodiments, opponents $O_1$, $O_2$, and/or $O_3$ wear at least one of headgear 104, bands 106, and clothing 108 including user sensor 94 and use feedback system 10.

User sensors 94 may be or include a wide variety of sensors configured to acquire various types of data regarding user $P_1$ (e.g., user data, first data, condition data, gaze data, etc.), area 200 (e.g., environment data, etc.), opponents $O_1$, $O_2$, and $O_3$ (e.g., second data, gaze data, etc.), and the like. For example, in one embodiment, user sensors 94 are configured to acquire user data regarding a user wearing user sensors 94. The user data may include a position of the user, an acceleration and/or velocity of the user, positions and/or orientations of various body parts of the user, and so on. In some embodiments, user sensors 94 are configured to acquire user data and/or gaze data regarding other users or objects (e.g., in addition to or rather than the user wearing sensors 94). The user data and/or gaze data may include a position of another user, an acceleration and/or velocity of the other user, positions and/or orientations of various body parts of the other user, an affiliation of the other user, a gaze direction of the other user, and so on. In addition, various data may be obtained in absolute terms (e.g., position, velocity, acceleration) and transformed into relative terms for two or more users (e.g., by comparing absolute values of various users, etc.).

In one embodiment, user sensors 94 are or include an inertial sensing device, such as an accelerometer, a gyroscope, and the like. In other embodiments, user sensors 94 are or include an image capture device, such as a still image and/or video camera. In further embodiments, user sensors 94 include a GPS receiver. In addition to such passive sensors, user sensors 94 may in some embodiments be or include an active sensor, such as a lidar system, radar system, sonar system (e.g., an ultrasonic sonar or sensing system), etc.

In other embodiments, user sensors 94 are configured to provide data regarding team affiliations of various users. For example, user sensors 94 in some embodiments are or include a beacon, such as an RFID tag, that may be carried by each user. The RFID tags may provide team affiliation data, and may provide user-specific data, such as a user height, weight, etc. (e.g., through near field communication, etc.). In one embodiment, the beacons communicate with one another. In other embodiments, signals from the beacons are received by external sensors 92 to be provided to control system 20.

In one embodiment, user sensors 94 are configured to acquire gaze data indicative of an orientation of a user's head (e.g., a direction in which the user is facing, a tilt of the head relative to the horizon, etc.). As such, user sensors 94 may be spaced about the user's head to form a sensor array configured to acquire positional data regarding the orientation of the user's head. In some embodiments, user sensors 94 are configured to scan an environment to acquire environment data regarding potential hazards or dangers near the user. In some embodiments, user sensors 94 are configured to acquire condition data regarding a condition of the user.

In some embodiments, feedback system 10 is implemented as part of a vehicle operator system, such that one or more user sensors 94 are provided as part of a vehicle. For example, a vehicle may include one or more user sensors 94 configured to provide sensor data to control system 20 regarding other vehicles or objects. Furthermore, the vehicle (e.g., a vehicle computer or control system, etc.) may be configured to provide additional data regarding operation of the vehicle, such as information regarding velocity, acceleration, braking conditions, and the like. A user (e.g., a motorcycle operator, a racecar driver, a bicycle rider, etc.) may wear a head protection device such as headgear 104 (e.g., helmet such as a football, baseball, or hockey helmet, a motorcycle or bicycle helmet, a soldier helmet, a ski helmet, etc.) configured to house additional user sensors 94 and/or portions of control system 20 and provide feedback. For example, feedback may be provided to a driver of a first vehicle to indicate that a driver of a second vehicle is in the blind spot of the driver of the first vehicle. As a result, the feedback may substantially reduce the likelihood of a collision between the two vehicles.

Referring back to FIGS. 8-9, the various sensors (e.g., external sensors 92, user sensors 94, etc.) acquire data regarding user $P_1$, opponents $O_1$, $O_2$, $O_3$, and/or area 200 and provide the data to control system 20. Control system 20 is configured to control operation of feedback device 100 to provide feedback (e.g., haptic feedback, visual feedback, audible feedback, etc.) to user $P_1$ based on the data received from sensor system 90 (e.g., external sensors 92, user sensors 94, etc.). For example, referring further to FIG. 8, user $P_1$ is shown to be within area 200, along with opponents $O_1$ and $O_2$. Opponents $O_1$ and $O_2$ are in close proximity (e.g., pose a possible threat, etc.) to user $P_1$, while opponent $O_3$ is not within a close proximity (e.g., does not pose a threat, substantially far from user $P_1$, not in play, etc.). As such, based on sensor data (e.g., head orientation, affiliation, position, movement, external data, user data, etc.) from sensor system 90, control system 20 is configured to provide feedback to user $P_1$ via feedback device 100. In one embodiment, feedback device 100 provides the user with feedback such that the user has a heightened awareness of the opponents and/or threats outside of his/her field of view. For example, opponent $O_2$ is not within the field of view of user $P_1$ such that user $P_1$ is unable to see opponent $O_2$. In other embodiments, feedback device 100 further provides the user with feedback for opponents within the user's field of view to reinforce the intuitive understanding of what each vibration or other type of feedback (e.g., audible, visual, etc.) represents or to establish an affiliation of the person in the user's field of view. For example, opponent $O_1$ is within the field of view of user $P_1$ such that user $P_1$ is able to see opponent $O_1$.

In one embodiment, feedback device 100 provides the user with feedback based on the gaze data such that the user has a heightened awareness of the opponents and/or threats that may be looking at them. The gaze data may provide an indication to the position and view angle of the opponents. The position of user and opponents may be defined by a global coordinate system such as a Cartesian coordinate system (X position, Y position, Z position, etc.) within area 200. The view angle of the opponents may be defined based on the orientation of a user's head. Thus, based on the position of the user, and the position and view angle of the opponent, control system 20 may determine whether the user is in or substantially near being within the opponent's line of sight. In some embodiments, feedback device 100 provides the user with feedback based on the gaze direction of opponents and/or a distance of the opponents relative to the user, as described above.

In some embodiments, sensor system 90 is configured to acquire environment data regarding potential hazards or dangers near the user. Feedback device 100 may provide feedback to the user based on the environment data and/or the user data. For example, a construction worker may be using feedback system 10 while working on a construction site. The feedback system 10 may monitor the surrounding area for potential hazards such as ledges, stairs, holes, trenches, hot surfaces or objects, hazardous materials or chemicals, sharp objects, moving equipment (e.g., vehicles, conveyor belts, rotating machinery, etc.), etc. Thus, if a user of feedback system 10 were to approach the hazard (e.g., unknowingly, etc.), feedback system 10 may be configured to warn the user not to move any closer, avoid contact, move in a proposed direction, etc. to prevent the user from encountering or engaging the hazard or danger (e.g., such that the user avoids the danger or hazard all together, to try to prevent harm from being inflicted onto the user, etc.). For example, a construction worker may be working on a skyscraper where there is a risk of falling over an edge of one of the floors. Feedback system 10 may be configured to warn the user when they approach the edge of the building such that they do not move any closer. In another example, sensor system 90 may include infrared cameras (e.g., in a manufacturing environment, in a labspace, etc.) that may facilitate feedback system 10 to warn a user not to touch an object or keep hands away because of a relatively hot surface. In yet another example, feedback system 10 may be configured to warn the user to move or not to move based on approaching objects or equipment (e.g., vehicles, fork lifts, cranes, tractors, skid-loaders, not in the sight of the user, etc.).

Feedback system 10 may also be able to monitor the condition of the user. Thus, sensor system 90 may acquire condition data indicative of a condition of the user. For example, feedback system 10 may be configured to monitor conditions of the user such as heart rate, breathing patterns, temperature, sleeplessness/alertness, SpO2 levels, glucose levels, hydration levels, and/or other conditions that may be affected during sports, physical activity (e.g., running, etc.), and/or work (e.g., construction, surgery, etc.). Feedback system 10 may be configured to provide feedback to the user regarding his/her physical condition (e.g., changes thereof, condition readings exceeding or falling below a threshold value, etc.) such that the user may take appropriate action (e.g., take a break, get some sleep, eat some food, drink some fluids, etc.).

Communication Protocols

Figure 10A:
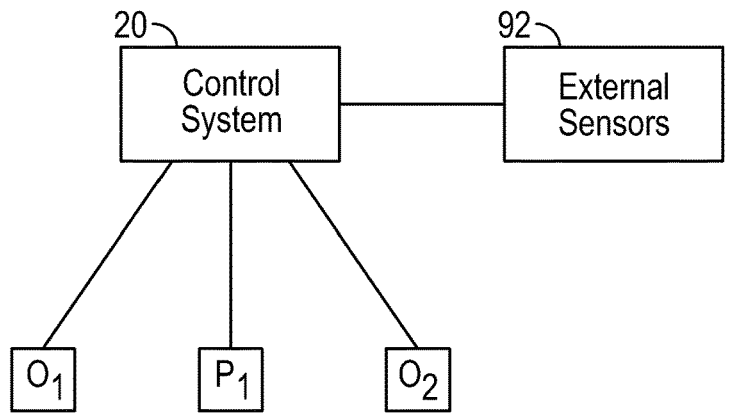
FIG. 10A is a block diagram illustrating communication from users to a control system of a feedback system, according to one embodiment.
Figure 10B:
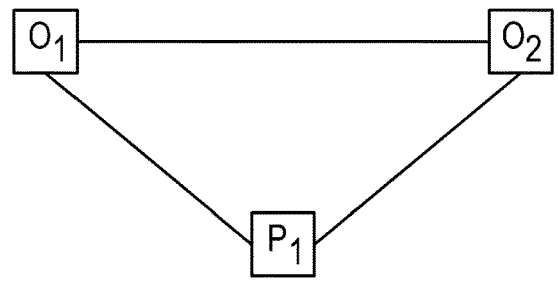
FIG. 10B is a block diagram illustrating communication between users of a feedback system, according to one embodiment.
Figure 10C:
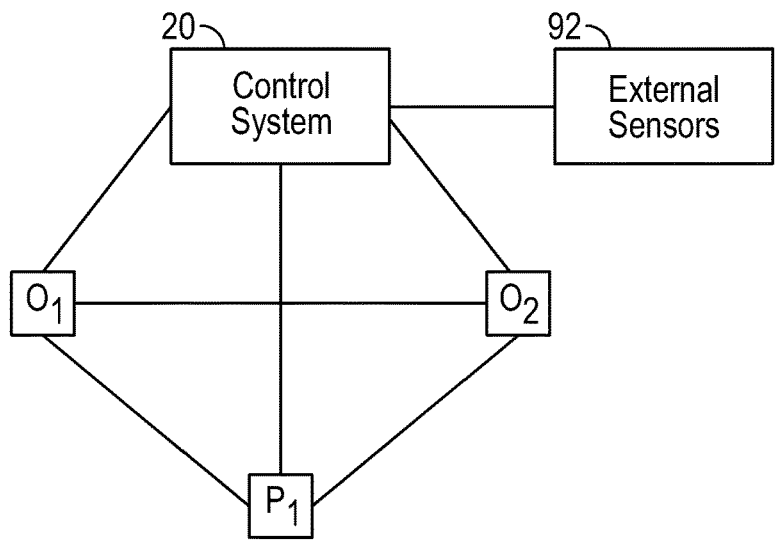
FIG. 10C is a block diagram illustrating communication between users and a control system of a feedback system, according to one embodiment.

Referring now to FIGS. 10A-10C, user $P_1$, opponents $O_1$ and $O_2$, sensor system 90, and/or control system 20 may communicate with each other in a variety of ways, using any suitable wired and/or wireless communications protocols. User $P_1$ generally includes one or more user sensors 94 and one or more feedback devices 100 (see, e.g., FIG. 9). In one embodiment, control system 20 is implemented as a remote system configured to communicate with one or more users of feedback system 10 (e.g., via corresponding feedback devices 100, etc.). For example, referring to FIG. 10A, user $P_1$, opponent $O_1$, and opponent $O_2$ are configured to communicate user data, gaze data, and/or environment data to control system 20, which is in turn configured to receive external data, gaze data, and/or environment data from external sensors 92. Control system 20 is configured to provide feedback to each user based on at least one of user data, gaze data, environment data, and external data to increase the awareness of each user regarding threats around them (e.g., opponents, etc.).

In other embodiments, control system 20 is implemented into equipment worn, carried, or otherwise moving with the users of feedback system 10, such that the devices of user $P_1$ and opponents $O_1$ and $O_2$ can communicate directly with one another. For example, referring to FIG. 10B, user sensors 94 are configured to acquire user data, gaze data, and/or environment data regarding user $P_1$ and/or opponents $O_1$ and $O_2$. Based on the user data, gaze data, and/or environment data, control system 20 of the respective user (e.g., user $P_1$, opponent $O_1$, etc.) is configured to provide feedback to the user. In one embodiment, users with the same affiliation (e.g., same team, etc.) communicate with one another (e.g., regarding feedback received, etc.) such that a user may receive advanced notification of opponents/enemies near other users with the same affiliation. This example embodiment is able to be used in ad hoc environments (e.g., unfamiliar environments, hostile environments, environments without external sensors 92, etc.). For example, the configuration shown in FIG. 10B may be implemented with soldiers in hostile environments or for training purposes.

In further embodiments, user $P_1$, opponent $O_1$, and/or opponent $O_2$ are configured to communicate user data, gaze data, and/or environment data to at least one of control system 20 and other users/opponents, which are in turn configured to receive gaze data, environment data, and/or external data from external sensors 92. For example, referring to FIG. 10C, control system 20 is configured to provide feedback to each user based on at least one of the user data, the gaze data, the environment data, and the external data to increase the awareness of each user regarding threats around them (e.g., opponents, etc.). In one embodiment, users with the same affiliation (e.g., same team, etc.) communicate with one another (e.g., regarding feedback received, etc.) such that a user may receive advanced notification of opponents/enemies near other users with the same affiliation.

Feedback Actuation Functions

According to an exemplary embodiment, processing circuit 30 is configured to provide feedback to the user of feedback device 100 based on a feedback actuation function. The feedback actuation function may include a presence actuation function, a distance actuation function, and/or a direction actuation function. The presence actuation function is configured to provide a sense of a presence of an object (e.g. another person, a secondary object, within a proximity of the user or primary object, etc.). The sense of the presence may include a sense of a scale, an energy, a mass, a movement capability, a nature, and a threat level of the object, among other possibilities. The presence actuation function may provide a user or give the user the ability to provide a sense of a threat or friendliness. For example, a user may receive feedback from another person, such as a stroke along the back or a hugging sensation, to provide a sense of comfort. This may be implemented in situations such as a parent providing comfort to his/her premature baby that is isolated from physical contact or family members living apart from one another and being able to give a loved one a simulated hug, among other examples.

The distance actuation function is configured to provide a sense of a distance of an object relative to the user or primary object. The direction actuation function is configured to provide a sense of a direction of an object relative to the user or primary object. The relative priority of the presence actuation function, the distance actuation function, and the direction actuation function may vary responsive to the distance, the direction, and the nature of the object relative to the user or primary object. In some embodiments, the feedback actuation function is based on the relative position of elements 102 on the user of feedback device 100, the relative position of the user, and/or the relative position of the object. By way of example, feedback may need to be provided in a desired location, however the position of elements 102 may not facilitate the application of feedback in the desired location. Therefore, the feedback actuation function may actuate various elements 102 around the desired location. For example, processing circuit 30 may actuate elements 102 in a circular pattern around the desired location to indicate the location in which feedback is desired to be provided.

The feedback actuation function may be a continuous function, a discrete function, a linear function, a non-linear function, or any combination thereof. By way of example, the distance actuation function may increase an amplitude of the feedback linearly as an object (e.g., another person, a secondary object, etc.) gets closer to the user or primary object, or vice versa (e.g., inversely proportional to the distance, etc.). By way of another example, the distance actuation function may increase the amplitude of the feedback non-linearly (e.g., exponentially, quadratically, etc.) as an object (e.g., another person, a secondary object, etc.) gets closer to the user or primary object, or vice versa.

In one embodiment, processing circuit 30 is configured to modify the feedback actuation function responsive to a user response to previously-provided feedback (e.g., reduce, amplify, alter, etc.). The user response may include, but is not limited to, a body movement, a head movement, a temperature, a heart rate, a skin conductivity, a facial expression, a vocal expression, pupil dilation, brain waves, and/or a brain state. By way of example, processing circuit 30 may actuate various elements 102 as a user of feedback device 100 rotates his/her head. For example, processing circuit 30 may provide a vibration to a side of a user's head to indicate an object is to the user's side. As the user turns his/her head, the direction actuation function may modify which elements 102 provide feedback to the user such that the vibrations move as the user's head turns until the user's head is facing the indicated direction (e.g., the vibrations may move counter-clockwise as the user turn his/her head clockwise, etc.). The various functions disclosed herein may be embodied as instructions or programs implemented on or accessed by feedback system 10. In one embodiment, the instructions and/or programs are stored locally in memory (e.g., memory 38, etc.) of feedback system 10. In another embodiment, the instructions and/or programs are accessed via any suitable wired or wireless communication protocol to an external memory or via the Internet. Access to the Internet may provide for the ability to update the instructions and/or programs of feedback system 10 (e.g., periodically, when an update is released, etc.).

Methods of Providing Feedback

Figure 11:
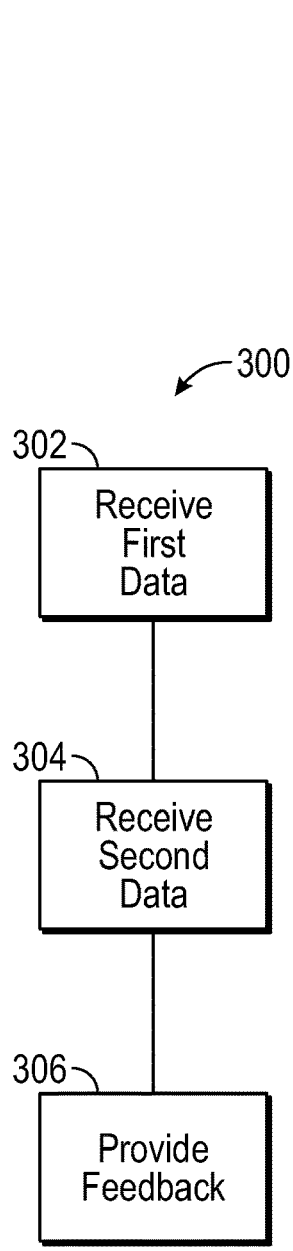
FIG. 11 is a block diagram of a method for providing feedback to a user of a feedback system, according to one embodiment.

Referring now to FIG. 11, method 300 for providing feedback to a user is shown according to an example embodiment. In one example embodiment, method 300 may be implemented with electronic game feedback system 10 of FIGS. 1-7B. In another example embodiment, method 300 may be implemented with feedback system 10 of FIGS. 1 and 8-10C. Accordingly, method 300 may be described in regard to FIGS. 1-7B and/or FIGS. 1 and 1-10C.

At 302, first data is received. In one embodiment, the first data includes data regarding a user of a primary object (e.g., gaze data, condition data, movement, etc.). In another embodiment, first data includes data regarding a primary object in a virtual environment (e.g., gaze data, condition data, etc.). In an alternative embodiment, the first data may include user data regarding a user involve in a real world event (e.g., a race, an athletic event, combat, etc.). At 304, second data is received. In one embodiment, the second data includes data regarding a secondary object (e.g., another virtual character, threat object, gaze data, condition data, movement, attributes, etc.). In another embodiment, the second data includes event data. In an alternative embodiment, the second data includes data regarding an opponent (e.g., an enemy, another vehicle, other team, etc.), object data, display data, and/or external data. At 306, feedback is provided. In one embodiment, feedback is provided to a user of a primary object based on user data, primary object data, secondary object data, and/or event data. In an alternative embodiment, feedback is provided to a user based on user data regarding a user, user data regarding an opponent, and/or external data. In some embodiments, feedback is provided to a user based on at least one of user data, gaze data, condition data, event data, environment data, external data, display data, and object data. The feedback may be haptic, audible, visual, combinations thereof, etc.

Figure 12:
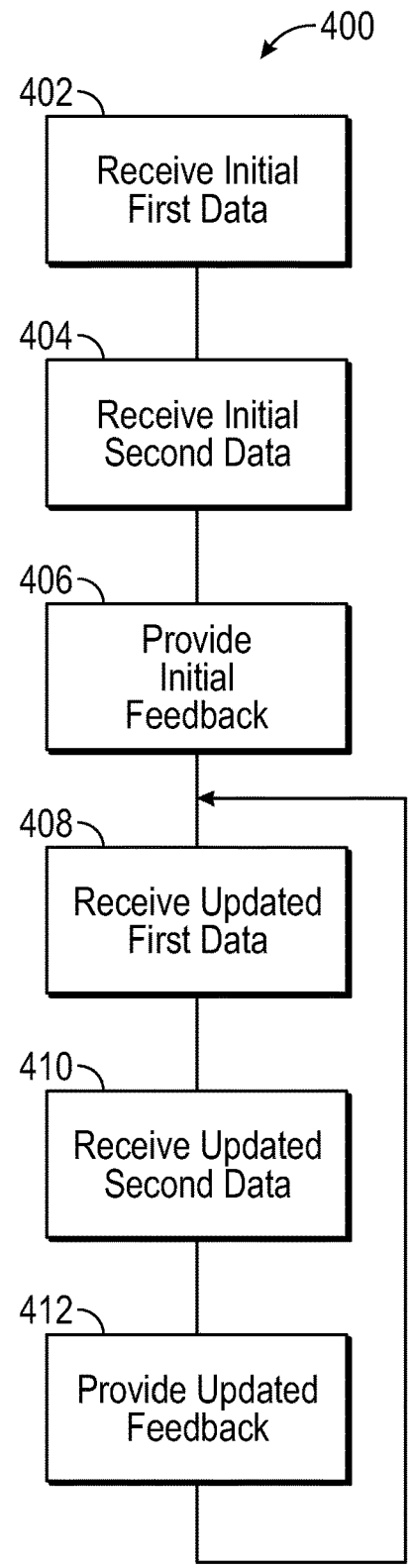
FIG. 12 is a block diagram of a method for providing continual feedback to a user of a feedback system, according to one embodiment.

Referring now to FIG. 12, method 400 for providing continual feedback to a user is shown according to an example embodiment. In one example embodiment, method 400 may be implemented with electronic game feedback system 10 of FIGS. 1-7B. In another example embodiment, method 400 may be implemented with feedback system 10 of FIGS. 1 and 8-10C. Accordingly, method 400 may be described in regard to FIGS. 1-7B and/or FIGS. 1 and 8-10C.

At 402, initial first data is received. In one embodiment, the first data includes data regarding a user of a primary object (e.g., gaze data, condition data, movement, etc.). In another embodiment, first data includes data regarding a primary object in a virtual environment (e.g., gaze data, condition data, etc.). In an alternative embodiment, the first data may include user data regarding a user involve in a real world event (e.g., a race, an athletic event, combat, etc.). At 404, initial second data is received. In one embodiment, the second data includes data regarding a secondary object (e.g., another virtual character, threat object, gaze data, condition data, movement, attributes, etc.). In another embodiment, the second data includes event data. In an alternative embodiment, the second data includes data regarding an opponent (e.g., an enemy, another vehicle, other team, etc.), object data, display data, and/or external data. At 406, initial feedback is provided. In one embodiment, feedback is provided to a user of a primary object based on user data, primary object data, secondary object data, and/or event data. In an alternative embodiment, feedback is provided to a user based on user data regarding a user, user data regarding an opponent, and/or external data. In some embodiments, feedback is provided to a user based on at least one of user data, gaze data, condition data, event data, environment data, external data, display data, and object data. The feedback may be haptic, audible, visual, combinations thereof, etc.

At 408, updated first data is received. For example, the initial first data received at 402 is updated based on a new position, gaze direction, condition, movement, etc. of the user and/or primary object. At 410, updated second data is received. For example, the initial second data received at 404 is updated based on a new position, gaze direction, condition, movement, etc. of the secondary object or opponent, or a change in the electronic game situation (e.g., a new event, level, etc.). At 412, updated feedback is provided based on the updated first data and the updated second data. In one embodiment, 408-412 are repeated to provide continuous feedback to a user of feedback system 10. As noted elsewhere herein, the feedback may include tactile/haptic, visual, audible, or other types of feedback or combinations thereof.

Figure 13:
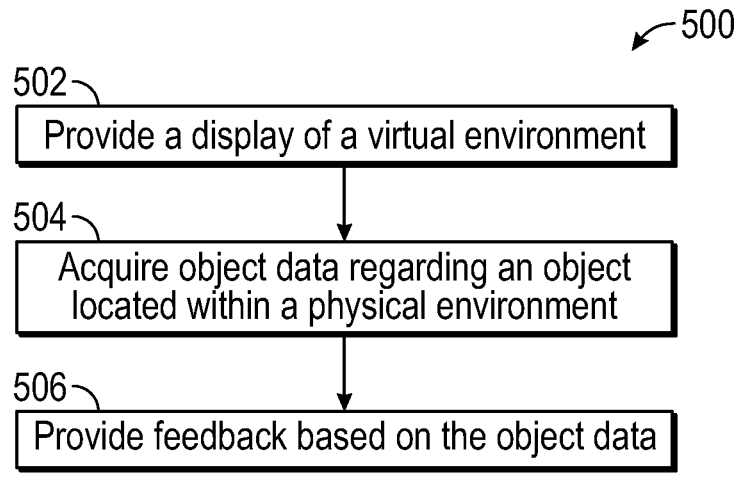
FIG. 13 is a block diagram of a method for providing feedback to a user of a feedback system, according to another embodiment.

Referring now to FIG. 13, method 500 for providing feedback to a user is shown according to another example embodiment. In one example embodiment, method 500 may be implemented with electronic game feedback system 10 of FIGS. 1-7B. Accordingly, method 500 may be described in regard to FIGS. 1-7B.

At 502, a display device (e.g., VR glasses 74, portable device 76, etc.) provides a display of a virtual environment associated with an electronic game to a user. The display device may at least partially obstruct the view of the user of a physical environment surrounding the user. At 504, a sensor system (e.g., sensor system 90, portable device sensors 96, user sensors 94, external sensors 92, VR glasses sensors, etc.) acquires object data regarding an object located within the physical environment. At 506, a feedback device (e.g., feedback device 100, etc.) provides feedback (e.g., haptic feedback, audible feedback, visual feedback, etc.) to the user based on the object data. The feedback may be indicative of a location of the object relative to the user. In some embodiments, the feedback includes the display device displaying a virtual representation of the physical object within the virtual environment. The virtual representation may provide an indication of a location of the physical object relative to the user within the physical environment.

Figure 14:
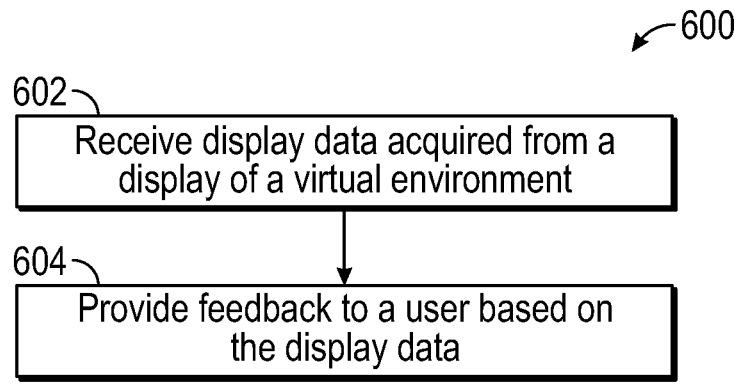
FIG. 14 is a block diagram of a method for providing feedback to a user of a feedback system, according to yet another embodiment.

Referring now to FIG. 14, method 600 for providing feedback to a user is shown according to another example embodiment. In one example embodiment, method 600 may be implemented with electronic game feedback system 10 of FIGS. 1-7B. Accordingly, method 600 may be described in regard to FIGS. 1-7B.

At 602, a processing circuit (e.g., of haptic feedback system 10, of portable device 76, etc.) receives display data from a sensor system (e.g., sensor system 90, portable device sensors 96, external sensors 92, user sensors 94, etc.). The display data may be acquired by the sensor system from a display of a virtual environment associated with the electronic game provided by a display device (e.g., television 72, etc.). The electronic game may be associated with a primary object and a secondary object. The display data may be indicative of characteristics of at least one of the virtual environment, the primary object, and the secondary object. At 604, the processing circuit provides a command to a feedback device (e.g., feedback device 100, etc.) to provide feedback (e.g., haptic feedback, audible feedback, visual feedback, etc.) to the user based on the display data.

In some embodiments, the processing circuit is configured to identify the electronic game the sensor system is monitoring based on features provided by the display. The features may include at least one of the virtual environment, the primary object, the secondary object, a symbol, a radar, and a map. The processing circuit may be further configured to implement predefined feedback settings based on the detected electronic game. In other embodiments, the processing circuit is configured to prompt the user to manually input an identifier indicative of the electronic game via a portable electronic device (e.g., drop down menu, fill-in box, etc.). The processing circuit may be further configured to implement predefined feedback settings based on the identifier. In some embodiments, the processing circuit is configured to adaptively learn the virtual environment such that unknown virtual environments become known and stored in memory of the processing circuit for subsequent use.

Figure 15:
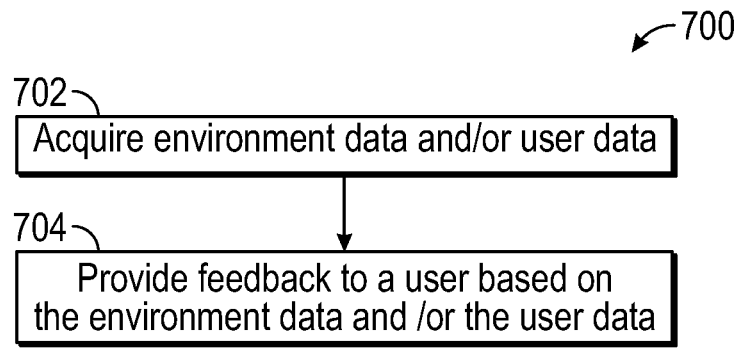
FIG. 15 is a block diagram of a method for providing feedback to a user of a feedback system, according to still another embodiment.

Referring now to FIG. 15, method 700 for providing feedback to a user is shown according to another example embodiment. In one example embodiment, method 700 may be implemented with feedback system 10 of FIGS. 8-10C. Accordingly, method 700 may be described in regard to FIGS. 8-10C.

At 702, a sensor (e.g., external sensor 92, user sensor 94, sensor system 90, etc.) acquires environment data regarding an environment surrounding the user and/or user data regarding at least one of movements, a location, and an orientation of the user within the environment. The environment data may include data regarding the one or more potential hazards or dangers within the environment surrounding the user. The one or more potential hazards or dangers may include at least one of a ledge, stairs, a hole, a trench, a hot objects, a sharp object, a hazardous material or chemical, a moving piece of equipment, and a rotating piece of equipment. At 704, a feedback device (e.g., feedback device 100, etc.) provides feedback (e.g., haptic feedback, audible feedback, visual feedback, etc.) to the user based on the environment data and/or the user data indicating the user is near the one or more potential hazards or dangers. According to one embodiment, the feedback is configured to provide an indication to the user to such that the user avoids the one or more potential hazards or dangers within the environment surrounding the user. In some embodiments, the feedback device is a wearable feedback device.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic game feedback system comprising:
    a camera device configured to acquire display data from a radar map provided within a display provided by a display device, the display being a display of a virtual environment associated with an electronic game, the electronic game associated with a primary object and a secondary object, wherein the display data is indicative of a characteristic of the secondary object relative to the primary object, the characteristic including at least one of a location, an orientation, a range, or a bearing of the secondary object relative to the primary object;
    a wearable feedback device configured to be worn by a user; and
    a processing circuit configured to:
        receive the display data from the camera device; and
        provide a command to the wearable feedback device to provide feedback to the user based on the characteristic of the secondary object relative to the primary object;
    wherein the wearable feedback device is configured to provide the feedback to the user of the wearable feedback device based on the command.

2. The electronic game feedback system of claim 1, wherein the camera device is incorporated into a portable electronic device.

3. The electronic game feedback system of claim 1, wherein the processing circuit is incorporated into at least of the wearable feedback device or the portable electronic device.

4. The electronic game feedback system of claim 1, wherein the camera device is configured to be positioned to acquire the display data from the virtual environment provided by the display device.

5. The electronic game feedback system of claim 4, wherein the processing circuit is not in communication with the electronic game nor the display device.

6. The electronic game feedback system of claim 1, wherein the processing circuit is configured to identify the electronic game the camera device is monitoring based on features provided by the display.

7. The electronic game feedback system of claim 6, wherein the features include at least one of the virtual environment, the primary object, the secondary object, a symbol, a radar, or a map.

8. The electronic game feedback system of claim 6, wherein the processing circuit is configured to implement predefined feedback settings based on the detected electronic game.

9. The electronic game feedback system of claim 1, wherein the display data includes at least one of an orientation of the primary object, a location of the primary object within the virtual environment, a movement of the primary object, a velocity of the primary object, an acceleration of the primary object, or a gaze direction of the primary object.

10. The electronic game feedback system of claim 1, wherein the display data includes at least one of an affiliation of the secondary object, a threat level of the secondary object, an attribute of the secondary object, a location of the secondary object, an orientation of the secondary object, movement of the secondary object, a velocity of the secondary object, an acceleration of the secondary object, or a gaze direction of the secondary object.

11. The electronic game feedback system of claim 1, wherein the display device is configured to display a radar map within the virtual environment.

12. The electronic game feedback system of claim 11, wherein the radar map provides an indication to the at least one of the location, the orientation, the range, or the bearing of the secondary object relative to the primary object.

13. The electronic game feedback system of claim 11, wherein the camera device acquires the display data from at least one of the virtual environment or the radar map.

14. The electronic game feedback system of claim 13, wherein the secondary object is not visible within the virtual environment but is visible on the radar map when the user receives the feedback.

15. The electronic game feedback system of claim 1, wherein the feedback is configured to provide an indication of at least one of a range or a direction between the primary object and the secondary object within the virtual environment.

16. The electronic game feedback system of claim 1, wherein the feedback is configured to provide an indication of at least one of an affiliation, an attribute, or a threat level of the secondary object.

17. The electronic game feedback system of claim 1, wherein the feedback device is configured to provide the feedback through at least one of (i) different classes of sensations including at least one of a tactile output, a visual output, or an audible output, (ii) different intensities, (iii) different frequencies, or (iv) different pulse patterns.

18. An electronic game feedback system comprising:
a wearable feedback device configured to be worn by a user; and
a portable user device including:
a camera device configured to acquire display data from a radar map provided within a display of a virtual environment associated with an electronic game provided by an external display device, the electronic game associated with a primary object and a secondary object, wherein the display data is indicative of a characteristic of the secondary object relative to the primary object, the characteristic including at least one of a location, an orientation, a range, or a bearing of the secondary object relative to the primary object; and
a processing circuit communicably and operatively coupled to the camera device and the wearable feedback device, the processing circuit configured to:
receive the display data from the camera device; and
provide a feedback command to the wearable feedback device based on the characteristic of the secondary object related to the primary object;
wherein the wearable feedback device is configured to receive the feedback command from the portable user device and implement the feedback command to provide feedback to the user.

19. The electronic game feedback system of claim 18, wherein the processing circuit is configured to identify the electronic game the camera device is monitoring based on features provided by the display.

20. The electronic game feedback system of claim 19, wherein the processing circuit is configured to implement predefined feedback settings based on the detected electronic game.

21. The electronic game feedback system of claim 18, wherein the portable electronic device is configured to be positioned to acquire the display data from the virtual environment provided by the display device.

22. The electronic game feedback system of claim 18, wherein the processing circuit is not in communication with the electronic game nor the display device.

23. The electronic game feedback system of claim 18, wherein the processing circuit receives the display data from the camera device regarding the virtual environment and the radar map.

24. The electronic game feedback system of claim 18, wherein the processing circuit is configured to provide a command to the wearable feedback device to vary the feedback through at least one of (i) different classes of sensations including at least one of a tactile output, a visual output, or an audible output, (ii) different intensities, (iii) different frequencies, or (iv) different pulse patterns.

25. A method for providing feedback to a user of an electronic game, the method comprising:
acquiring, by a camera device, display data from a radar map provided within a display of a virtual environment associated with the electronic game provided by a display device, the electronic game associated with a primary object and a secondary object, wherein the display data is indicative of a characteristic of the secondary object relative to the primary object, the characteristic including at least one of a location, an orientation, a range, or a bearing of the secondary object relative to the primary object;
receiving, by a processing circuit from the camera device, the display data;
providing, by the processing circuit to a wearable feedback device, a command to provide feedback to the user based on the characteristic of the secondary object relative to the primary object; and
implementing, by the wearable feedback device, the command to provide the feedback to the user.

26. The method of claim 25, wherein the camera device is incorporated into a portable electronic device, and wherein the processing circuit is included within the portable electronic device and communicably coupled to the camera device.

27. The method of claim 26, wherein the portable electronic device is configured to be positioned to acquire the display data from the radar map within the virtual environment provided by the display device.

28. The method of claim 25, wherein the processing circuit is not in communication with the electronic game nor the display device.

29. The method of claim 25, further comprising receiving, by the processing circuit from the camera device, the display data from the virtual environment and the radar map.

* * * * *